US012107318B2

(12) United States Patent
Irvine

(10) Patent No.: US 12,107,318 B2
(45) Date of Patent: Oct. 1, 2024

(54) DEVICE AND METHOD FOR REDUCING INTERFERENCE WITH ADJACENT SATELLITES USING A MECHANICALLY GIMBALED ASYMMETRICAL-APERTURE ANTENNA

(71) Applicant: Viasat Inc., Carlsbad, CA (US)

(72) Inventor: David H. Irvine, Carlsbad, CA (US)

(73) Assignee: Viasat, Inc., Carlsbad, CA (US)

( * ) Notice: Subject to any disclaimer, the term of this patent is extended or adjusted under 35 U.S.C. 154(b) by 0 days.

(21) Appl. No.: 18/109,381

(22) Filed: Feb. 14, 2023

(65) Prior Publication Data

US 2024/0030584 A1 Jan. 25, 2024

Related U.S. Application Data

(63) Continuation of application No. 17/245,258, filed on Apr. 30, 2021, now Pat. No. 11,605,875, which is a (Continued)

(51) Int. Cl.
*H01Q 1/12* (2006.01)
*H01Q 1/27* (2006.01)
(Continued)

(52) U.S. Cl.
CPC ............... *H01Q 1/125* (2013.01); *H01Q 1/27* (2013.01); *H01Q 3/08* (2013.01); *H01Q 3/245* (2013.01);
(Continued)

(58) Field of Classification Search
CPC ............ H01Q 1/125; H01Q 1/27; H01Q 3/08; H01Q 3/245; H01Q 3/26; H01Q 3/28; H01Q 3/30; H01Q 25/00
See application file for complete search history.

(56) References Cited

U.S. PATENT DOCUMENTS

| | | | |
|---|---|---|---|
| 3,599,495 A | 8/1971 | Brown et al. | |
| 4,803,490 A | 2/1989 | Kruger | |

(Continued)

FOREIGN PATENT DOCUMENTS

| | | |
|---|---|---|
| CA | 1011845 A1 | 6/1977 |
| EP | 1437796 A1 | 7/2004 |
| GB | 295493 A | 5/1996 |

OTHER PUBLICATIONS

European Search Report and Opinion dated Apr. 2, 2014, EP App. No. 13195191.5, 7 pgs.

*Primary Examiner* — Hoang V Nguyen
(74) *Attorney, Agent, or Firm* — Holland & Hart LLP

(57) ABSTRACT

Methods, apparatuses, and systems for two-way satellite communication and an asymmetric-aperture antenna for two-way satellite communication are disclosed. In one embodiment, a beam pattern for an asymmetric-aperture antenna is offset in a narrow beamwidth direction, and the offset beam pattern is directed by a mechanical gimbal, with the beam pattern offset made to reduce interference with an adjacent satellite. In additional embodiments, operational areas near the equator are identified for a given offset beam pattern, or a beam pattern offset may be adjusted over time to compensate for movement of the asymmetric-aperture antenna when attached to an airplane, boat, or other mobile vehicle.

13 Claims, 21 Drawing Sheets

Related U.S. Application Data continuation of application No. 16/668,644, filed on Oct. 30, 2019, now Pat. No. 11,024,939, which is a continuation of application No. 16/052,605, filed on Aug. 1, 2018, now Pat. No. 10,483,615, which is a continuation of application No. 14/812,929, filed on Jul. 29, 2015, now Pat. No. 10,056,673, which is a continuation of application No. 13/830,323, filed on Mar. 14, 2013, now Pat. No. 9,123,988.

(60) Provisional application No. 61/731,405, filed on Nov. 29, 2012.

(51) Int. Cl.

| | |
|---|---|
| ***H01Q 3/08*** | (2006.01) |
| ***H01Q 3/24*** | (2006.01) |
| ***H01Q 3/26*** | (2006.01) |
| ***H01Q 3/28*** | (2006.01) |
| ***H01Q 3/30*** | (2006.01) |
| ***H01Q 25/00*** | (2006.01) |

(52) U.S. Cl.

CPC ................. *H01Q 3/26* (2013.01); *H01Q 3/28* (2013.01); *H01Q 3/30* (2013.01); *H01Q 25/00* (2013.01)

(56) References Cited

U.S. PATENT DOCUMENTS

| | | | | |
|---|---|---|---|---|
| 4,939,523 | A | 7/1990 | Jehle et al. | |
| 7,151,498 | B2 * | 12/2006 | Bassily ................ | H01Q 21/064 310/334 |
| 8,284,112 | B2 | 10/2012 | Otto et al. | |
| 2005/0003864 | A1 | 1/2005 | Elliot et al. | |
| 2005/0200541 | A1 | 9/2005 | Bassily | |
| 2009/0295654 | A1 | 12/2009 | Baker | |
| 2010/0265149 | A1 | 10/2010 | Omori et al. | |
| 2011/0215985 | A1 * | 9/2011 | Kaplan .................. | H01Q 21/08 343/879 |
| 2011/0298672 | A1 | 12/2011 | Otto | |

* cited by examiner

DEVICE AND METHOD FOR REDUCING INTERFERENCE WITH ADJACENT SATELLITES USING A MECHANICALLY GIMBALED ASYMMETRICAL-APERTURE ANTENNA

CROSS REFERENCE

The present application is a continuation of U.S. patent application Ser. No. 17/245,258 filed Apr. 30, 2021, entitled "DEVICE AND METHOD FOR REDUCING INTERFERENCE WITH ADJACEMENT SATELLITES USING A MECHANICALLY GIMBALED ASYMMETRICAL-APERTURE ANTENNA", which is a continuation of U.S. patent application Ser. No. 16/668,644 filed Oct. 30, 2019, entitled, "DEVICE AND METHOD FOR REDUCING INTERFERENCE WITH ADJACENT SATELLITES USING A MECHANICALLY GIMBALED ASYMMETRICAL-APERTURE ANTENNA", which is a continuation of U.S. patent application Ser. No. 16/052,605 filed on Aug. 1, 2018, entitled, "DEVICE AND METHOD FOR REDUCING INTERFERENCE WITH ADJACENT SATELLITES USING A MECHANICALLY GIMBALED ASYMMETRICAL-APERTURE ANTENNA" which is a continuation of U.S. patent application Ser. No. 14/812,929 filed on Jul. 29, 2015, entitled, "DEVICE AND METHOD FOR REDUCING INTERFERENCE WITH ADJACENT SATELLITES USING A MECHANICALLY GIMBALED ASYMMETRICAL-APERTURE ANTENNA", which is a continuation of U.S. patent application Ser. No. 13/830,323, filed on Mar. 14, 2013, entitled, "DEVICE AND METHOD FOR REDUCING INTERFERENCE WITH ADJACENT SATELLITES USING A MECHANICALLY GIMBALED ASYMMETRICAL-APERTURE ANTENNA," which claims the benefit of U.S. Provisional Patent Application Ser. No. 61/731,405, filed Nov. 29, 2012, entitled "DEVICE AND METHOD FOR REDUCING INTERFERENCE WITH ADJACENT SATELLITES USING A MECHANICALLY GIMBALED ASYMMETRICAL-APERTURE ANTENNA," each of which are incorporated by reference herein in their entirety.

BACKGROUND

This disclosure relates in general to communications and, but not by way of limitation, to satellite communication systems as well as antenna design and antenna operation to reduce interference with adjacent satellites during two way communications from mobile antennas to a target satellite.

Satellites are either in geostationary orbit (GSO) which is an orbit where the satellite is stationary relative to the surface of the earth, or in non-geostationary orbit (NGSO), traveling around the earth. A GSO satellite is in orbit approximately 35,800 km above the equator, and has a revolution around the earth that is synchronized with the earth's rotation. Therefore, the GSO satellite appears fixed in the sky to an observer on the earth's surface. GSO satellites may be placed anywhere along an arc above the earth's equator, which results in a significant number of adjacent satellites in a GSO, forming an arc of satellites across the sky in GSO that is referred to herein as the geostationary arc. One potential source of signal degradation in two-way communications between antennas and a target satellite is interference to and from a satellite that is adjacent to the target satellite.

There are a number of antenna solutions suitable for two-way mobile use, e.g. on aircraft, trains, boats, or trucks. These can be classified into various categories. One category is two-axis mechanically steerable asymmetric-aperture antennas. These work well at middle and high latitude due to the low scan loss for the antenna elevation angles at these latitudes. At low latitudes, however, there are scan loss and skew issues that create interference with adjacent satellites on the geostationary arc. A second category is planar arrays. These work well at middle to low latitudes. At high latitudes, however, these antennas suffer scan loss. Therefore, neither of the two types of antennas mentioned here work well at both extremes.

BRIEF DESCRIPTION OF THE DRAWINGS

The present disclosure is described in conjunction with the appended figures.

In the appended figures, similar components and/or features may have the same reference label. Further, various components of the same type may be distinguished by following the reference label by a dash and a second label or a letter label in conjunction with a number label that distinguishes among the similar components. If only the first reference label is used in the specification, the description is applicable to any one of the similar components having the same first reference label irrespective of the second reference label or letter associated with the first reverence label.

DETAILED DESCRIPTION

Embodiments disclosed herein relate to two-way satellite communications using asymmetric-aperture antennas configured to reduce or modify interference with satellites adjacent to a target communications satellite at certain locations. These communications systems and antennas are especially relevant for mobile airborne or ground communications, where an antenna is mounted on an airplane, truck, boat, or other vehicle. These communication systems may further improve the locations near the equator where certain asymmetric-aperture antennas may function.

One potential embodiment may operate in an airplane that travels between a first location where the skew between an antenna beam pattern and the geo arc allows an acceptable communication with the target satellite, and a second location where the skew of an antenna beam pattern will cause excessive interference with adjacent satellites. In such an installation, the beam pattern may be offset from the perpendicular direction away from a planar radiating surface of the antenna. A mechanical gimbal that directs the beam pattern may then adjust to direct the offset beam pattern toward the target satellite. Such an adjustment will alter the skew of the beam pattern, and if the adjustment is done appropriately relative to the geostationary arc, the interference with adjacent satellites may be reduced or limited to an acceptable level. Various embodiments for implementing such a system and antenna structure will be detailed below.

Figure 1A:
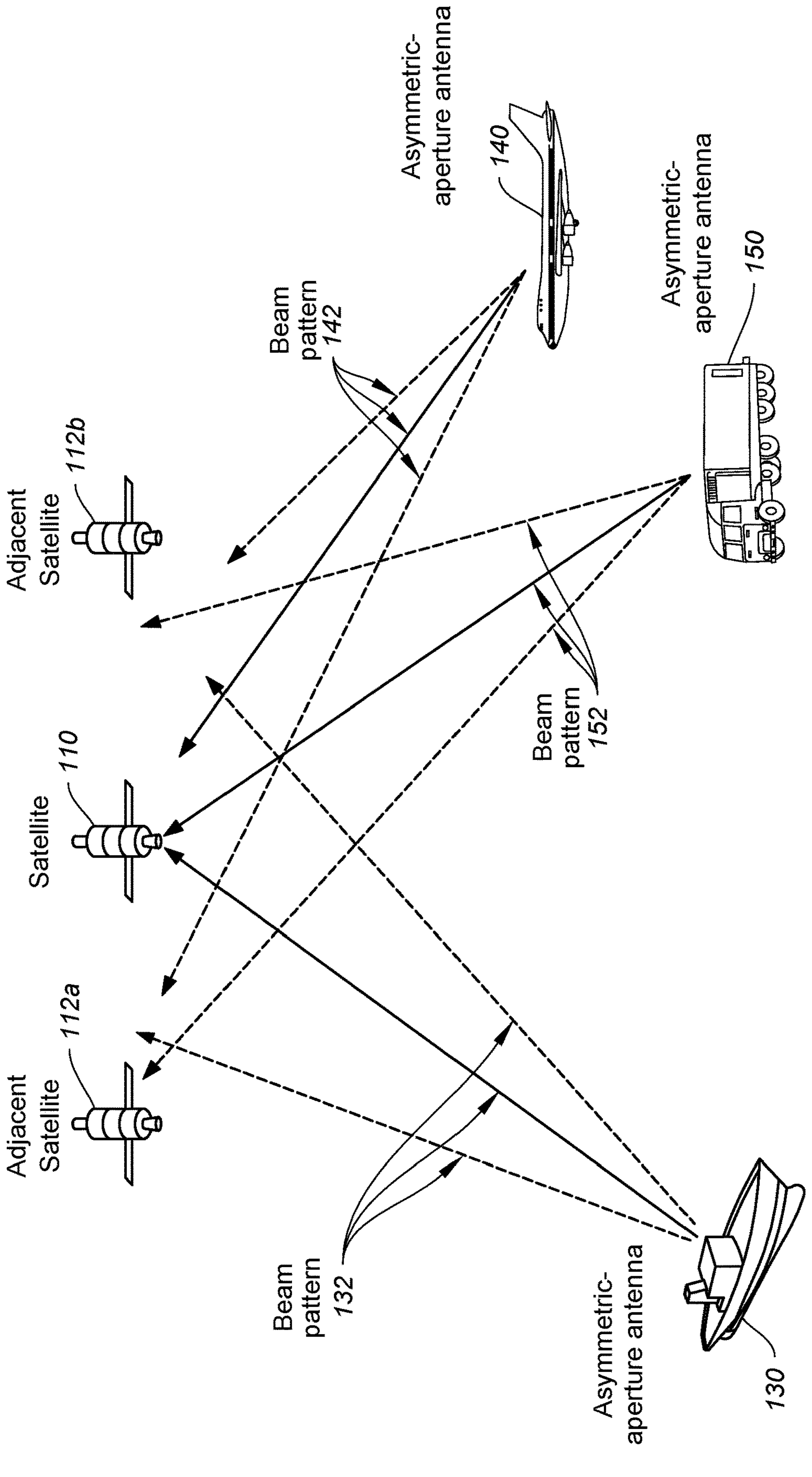
FIG. 1A shows a one aspect of an embodiment of a satellite communications system for use with various embodiments of the innovations presented herein.

FIG. 1A illustrates a two-way communication system between a target satellite shown as satellite 110, and a plurality of users operating with asymmetric aperture antennas, shown as a boat having asymmetric aperture antenna 130, an airplane having asymmetric aperture antenna 140, and a truck having asymmetric aperture antenna 150. Each asymmetric aperture antenna communicates with satellite 110 with an electromagnetic transmission that may be considered to be in the form of a beam pattern. Antenna 130 has beam pattern 132, antenna 150 has beam pattern 152, and antenna 140 has beam pattern 142. Such a system may account for interference with adjacent satellites 112*a* and 112*b*. As will be discussed in more detail in the next few figures, the beam pattern is not a tightly focused beam, but instead may be considered to have a center directional vector, and for an asymmetric-aperture antenna, both long and narrow beam pattern axis. When the long beam pattern axis of an antenna aligns with the geo arc, if the pattern is sufficiently broad, interference problems may arise from this low skew alignment.

FIGS. 1B through 1E provide additional details to describe the beam pattern of an asymmetrical-aperture antenna, and to explain the relationship between the beam pattern, the antenna radiating surface, and the control and direction of the antenna.

Figure 1B:
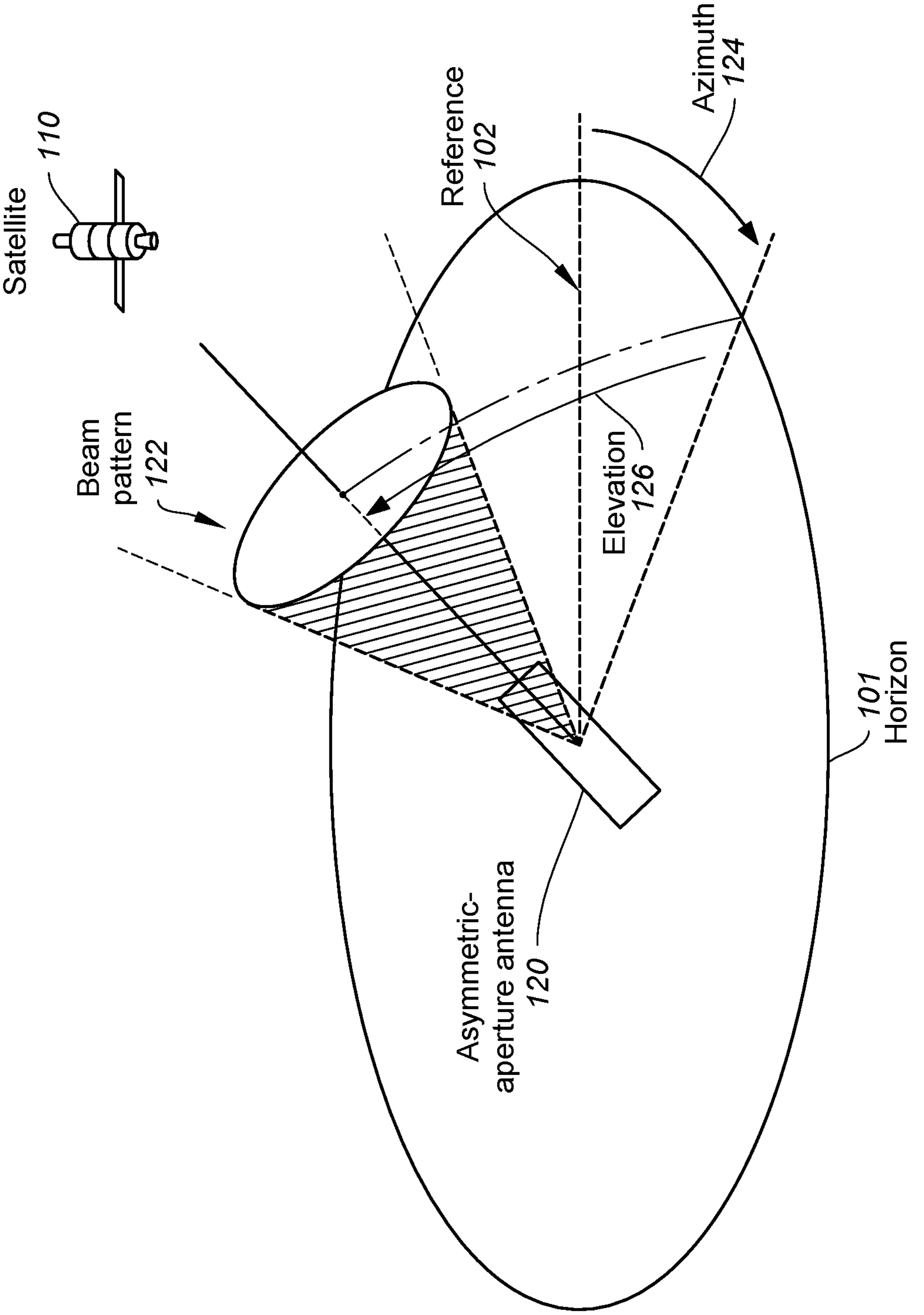
FIG. 1B shows a one aspect of an embodiment of a satellite communications system for use with various embodiments of the innovations presented herein.

FIG. 1B shows another perspective of an asymmetric aperture antenna 120. The horizon from the perspective of the antenna is illustrated by oval 101. The control and position of antenna 120, and the direction of the beam pattern from the antenna may be identified with respect to a reference 102. In certain embodiments, reference 102 may be considered a north direction along the ground at the horizon, as seen by antenna 120. The angle of adjustment along the horizon is considered azimuth 124, and the angle of adjustment up from the horizon is considered elevation 126. The direction of the center of beam pattern 122 for direction toward satellite 110 may thus be identified by a value for an azimuth 124 and elevation 126 adjustment.

Figure 1C:
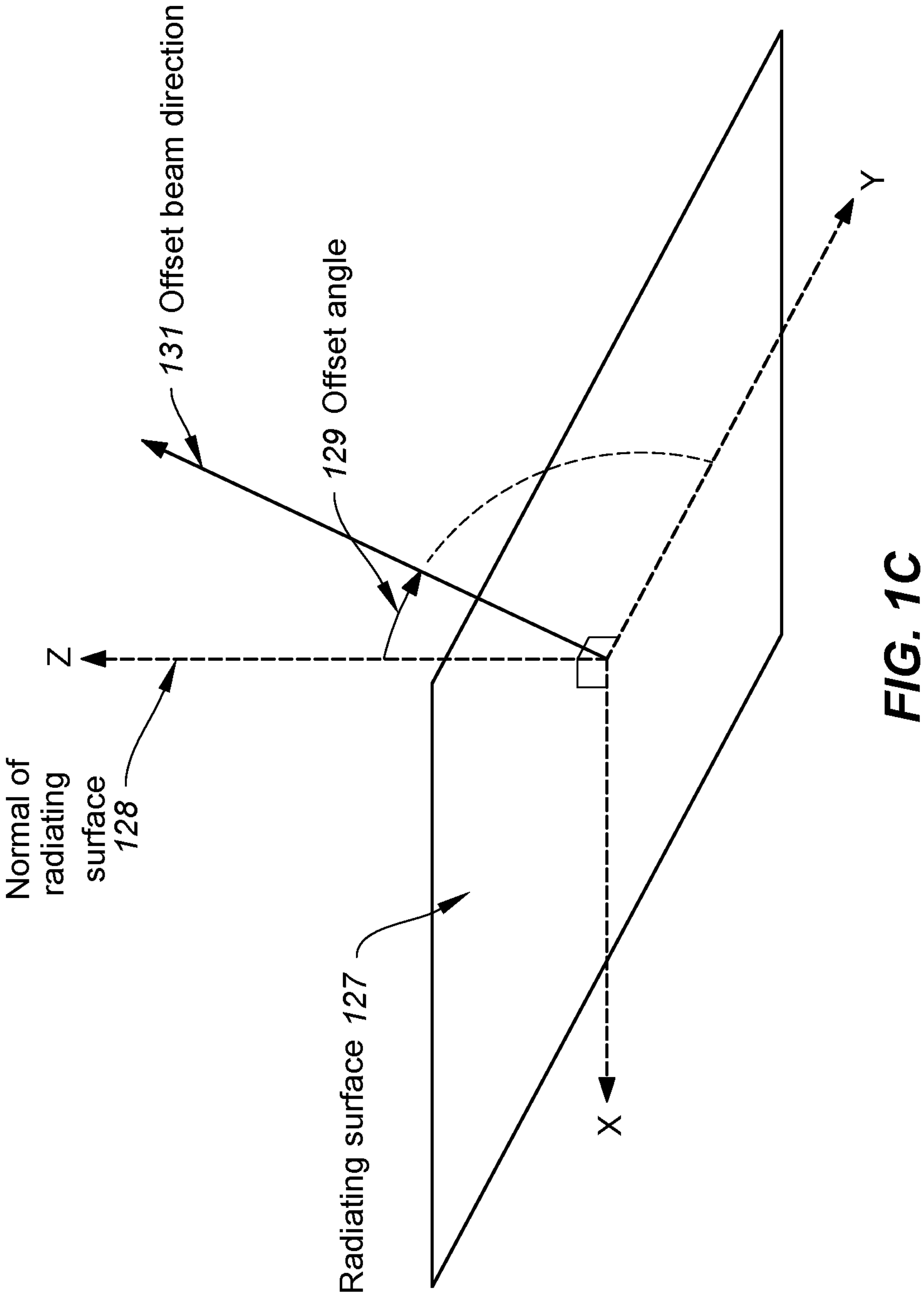
FIG. 1C shows a one aspect of an embodiment of an asymmetric-aperture antenna in accordance with various embodiments of the innovations presented herein.
Figure 1D:
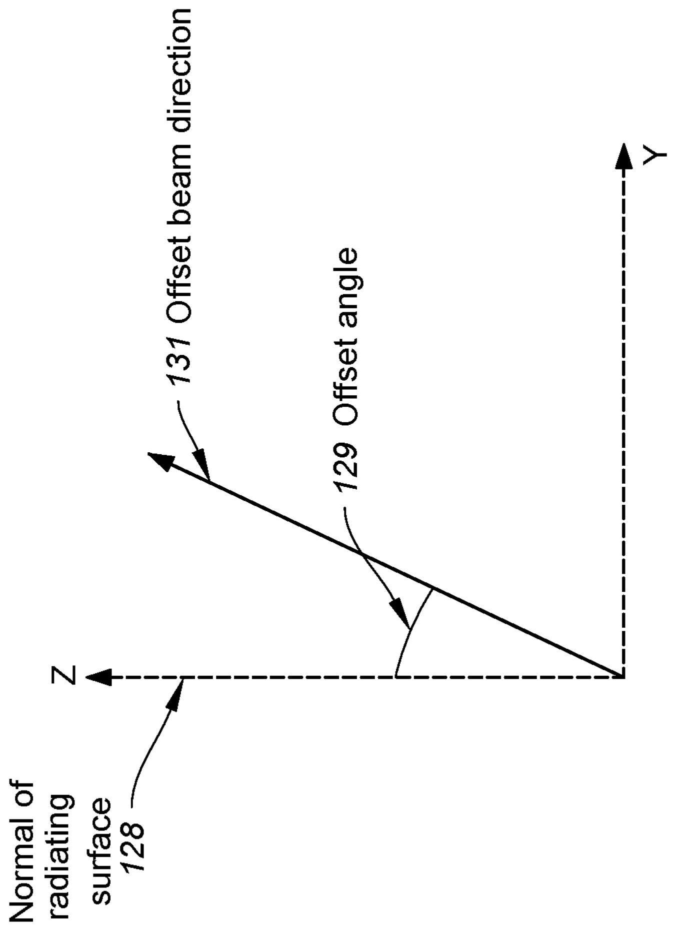
FIG. 1D shows a one aspect of an embodiment of an asymmetric-aperture antenna in accordance with various embodiments of the innovations presented herein.
Figure 1E:
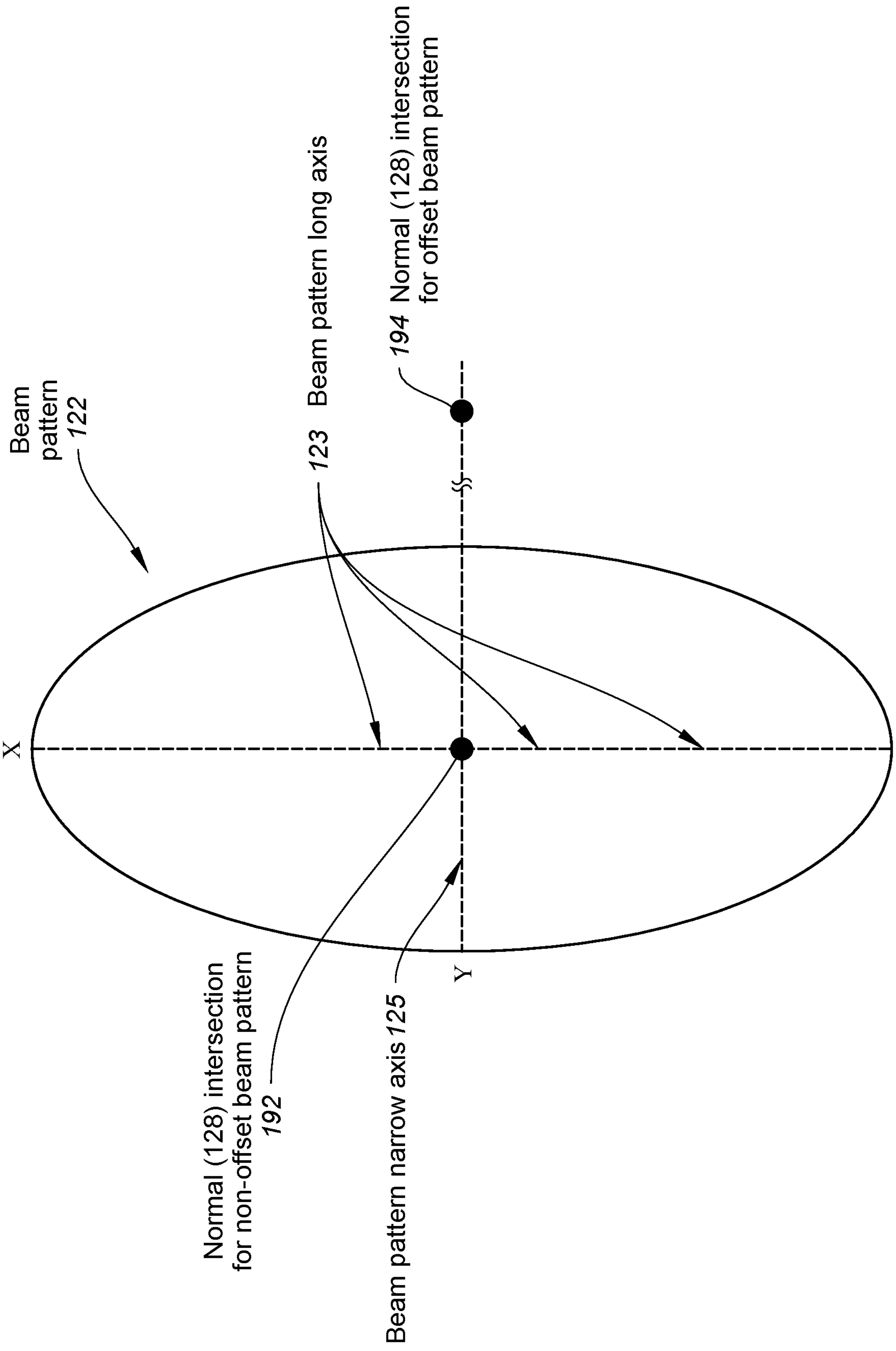
FIG. 1E shows a one aspect of an embodiment of an asymmetric-aperture antenna in accordance with various embodiments of the innovations presented herein.
Figure 1F:
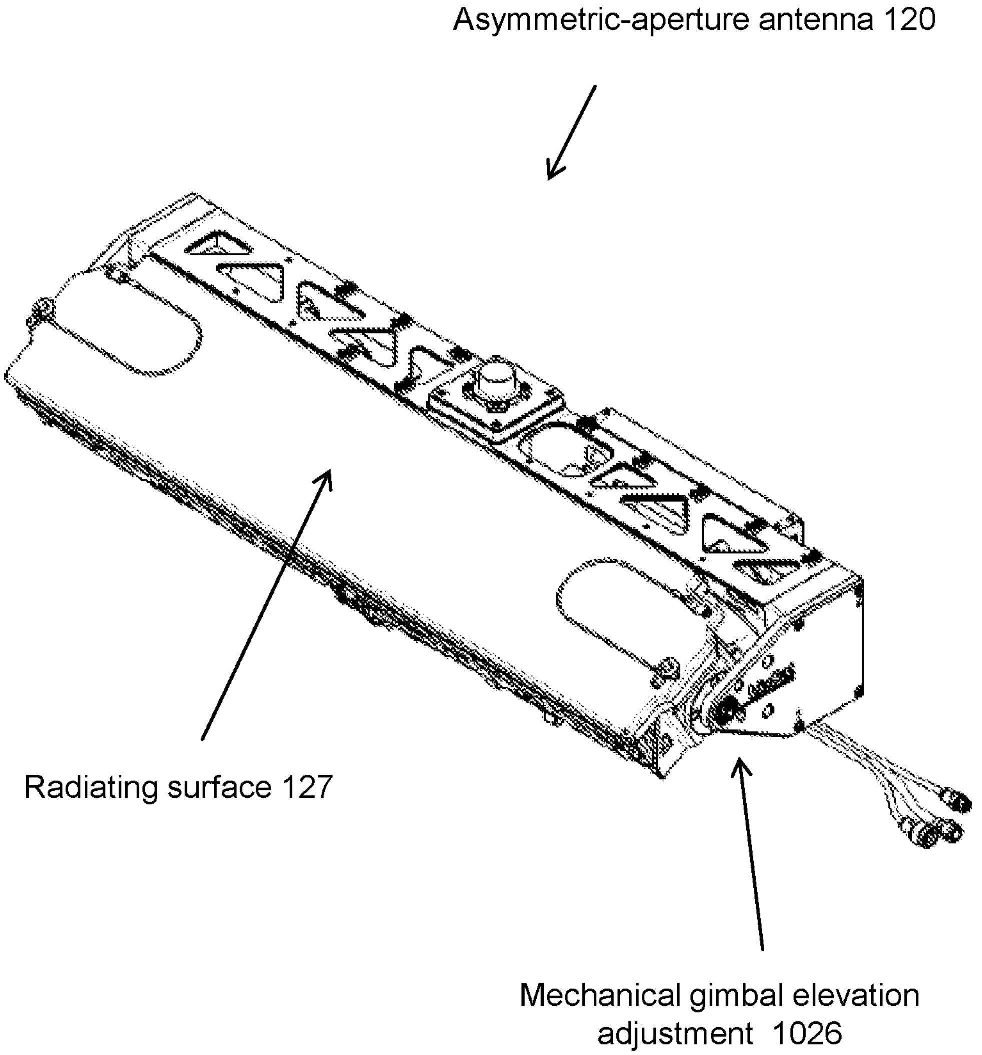
FIG. 1F shows a one aspect of an embodiment of an asymmetric-aperture antenna in accordance with various embodiments of the innovations presented herein.
Figure 1G:
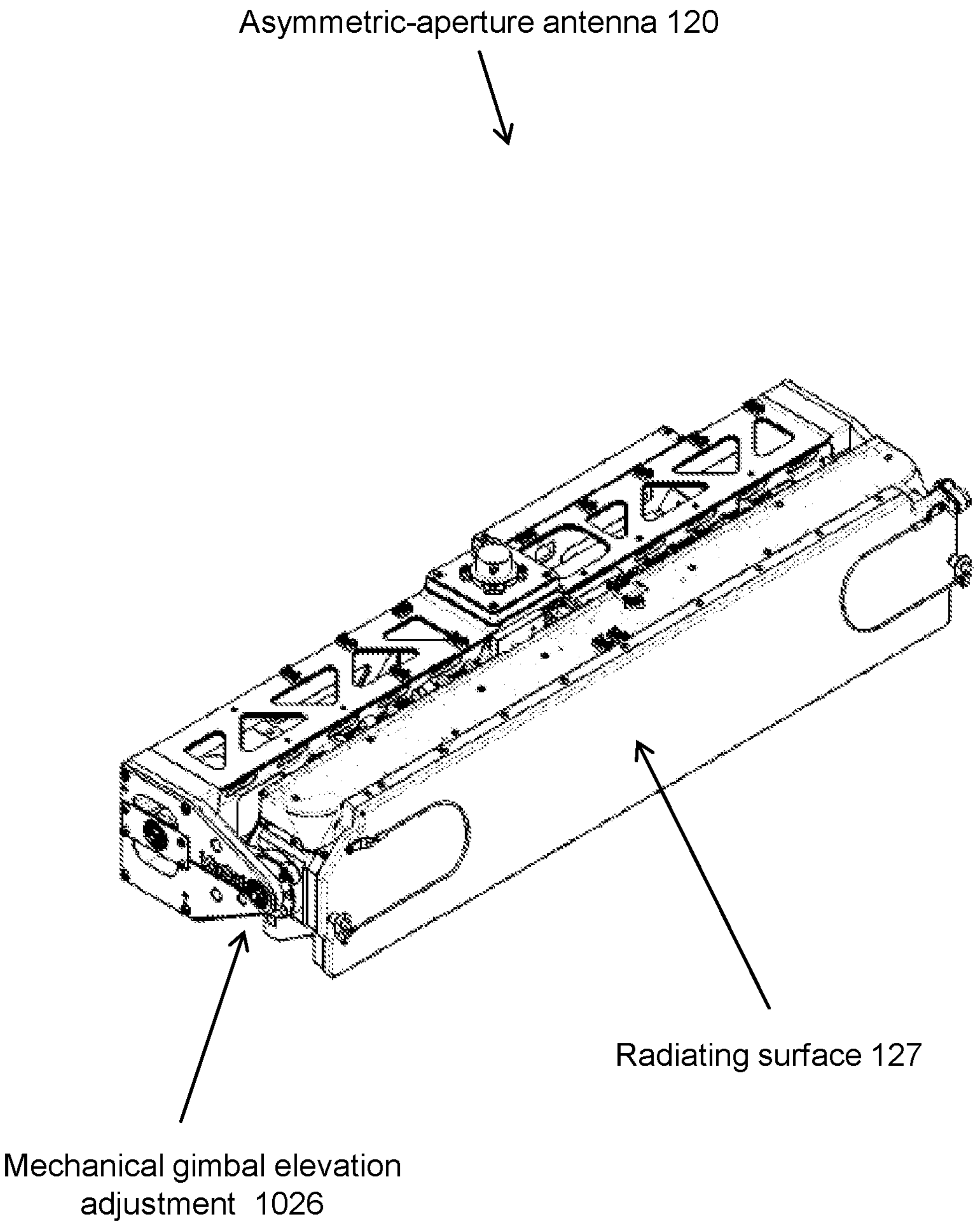
FIG. 1G shows a one aspect of an embodiment of an asymmetric-aperture antenna in accordance with various embodiments of the innovations presented herein.
Figure 1H:
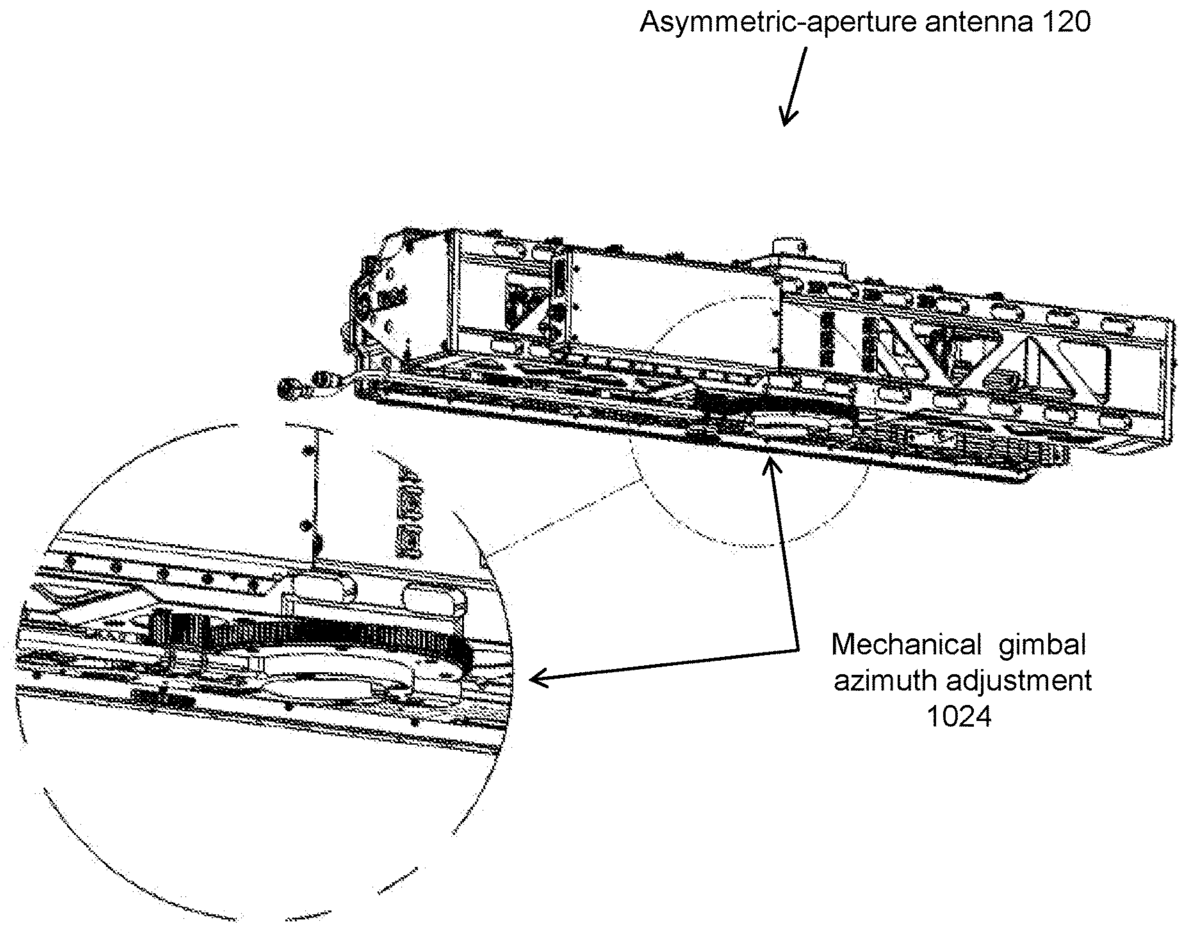
FIG. 1H shows a one aspect of an embodiment of an asymmetric-aperture antenna in accordance with various embodiments of the innovations presented herein.

FIGS. 1C and 1D show more detail of a radiating surface 127, which may also be seen in an illustrative embodiment of an asymmetric aperture antenna 120 shown in FIGS. 1F, 1G, and 1H. The radiating surface as shown in FIG. 1 is a planar surface, but in various alternative embodiments, may be non-planar. In the illustrative embodiment of FIG. 1C, radiating surface 127 has a long physical radiating surface direction along the y axis and a narrow physical radiating surface direction along the x axis. In an operation with no offset of the beam pattern, the center of the beam pattern will be at the z axis, which is perpendicular to the plane of the radiating surface, or 90 degrees from both the x and y axis when the radiating surface is in the x-y plane.

In various embodiments, the beam pattern is "offset" to form an offset beam pattern. An offset beam pattern is a beam pattern having a center in offset beam direction 131 as shown in FIG. 1C and FIG. 1D. As further shown in FIG. 1C, the offset angle 129 for offset beam direction 131 is in the z-y plane, when the long physical radiating surface is along the y-axis.

FIG. 1E shows an illustrative description of a beam pattern 122, having a long axis 123 and a narrow axis. The perspective of the beam pattern 122 is shown as if the observer is looking down beam pattern 122 toward the radiating surface 127 of antenna 120. Due to the nature of operation of an asymmetric-aperture antenna, and as illustratively shown by FIG. 1B, the beam pattern long axis 123 extends in the same direction as the narrow physical radiating surface. Similarly, the beam pattern narrow axis 125 extends in the same direction as the long physical radiating surface direction. Therefore, if the beam pattern 122 is offset in offset beam direction 131, this offset is in the beam pattern narrow axis 125 direction and in the long physical radiating surface direction. This offset as shown in FIG. 1C will be referred to as an offset in the narrow beamwidth direction.

As a further illustration of this offset, FIG. 1E describes a cross section of the beam pattern from asymmetric antenna 120. This cross section is located away from the antenna at a significant distance along the vector defining the center of the beam pattern, similar to the elliptical cross section of the beam pattern 122 away from antenna 120 as illustrated in FIG. 1B. For an antenna with a planar radiating surface, this cross section is in a plane parallel to the radiating surface. FIG. 1 E further shows normal/perpendicular line (128) intersection for a non-offset beam pattern 192, as well as normal/perpendicular line (128) intersection of offset beam pattern 194. In other words, for a non-offset beam pattern having the shape shown in FIG. 1E, the perpendicular line from radiating surface 128 along the z-axis in FIG. 1C will intercept the pattern shown in FIG. 1E at intersection for—non-offset beam pattern 192. For a beam pattern 122 that is offset by offset angle 129 in offset beam direction 131, the perpendicular line from radiating surface 128 along the z-axis will be far off from the center along beam pattern narrow axis 125, with an intersection as shown at intersection for offset beam pattern 194. As offset angle 129 grows, the intersection point for 194 would move further and further from the center of the beam pattern 122 of FIG. 1E.

FIGS. 1F, 1G, and 1H show one potential embodiment of a low profile asymmetric aperture antenna detailed as asymmetric-aperture antenna 120. Asymmetric-aperture antenna 120 includes radiating surface 127, mechanical gimbal elevation adjustment 1026 and mechanical gimbal azimuth adjustment 1024. FIG. 1F shows antenna 120 with the mechanical gimbal elevation adjustment 1026 at a large elevation 126 angle, while FIG. 1G shows mechanical gimbal elevation adjustment 126 at a low elevation 126 angle, pointed near horizon 101. In both FIG. 1F and FIG. 1G, mechanical gimbal azimuth adjustment 1024 is not visible, and would be at the bottom of antenna 120 as shown in FIG. 1H. Further, the low profile shown serves to reduce the wind drag when the antenna is mounted to a mobile vehicle. Especially at high speeds, such as in an antenna mounted to an aircraft, the use of a low profile asymmetric-aperture antenna in conjunction with systems for reducing adjacent satellite interference may provide improved performance and deployment characteristics such as improved performance from locations near the equator.

FIG. 1H shows a bottom view of antenna 120 with an enlarged section illustrating mechanical gimbal azimuth adjustment 1024. As mechanical gimbal azimuth adjustment 1024 rotates antenna 120 about a center point of antenna 120, the perpendicular line from the radiating surface 128 sweeps to a new azimuth 124 direction. Mechanical gimbal azimuth adjustment 1024 as shown adjusts a center point of antenna 120. In alternate embodiments, azimuth 124 may be adjusted from any point, including points on a mounting surface at an edge or away from the antenna. Similarly, while mechanical gimbal elevation adjustment 1026 is shown as rotating radiating surface 127 around the y-axis through the center of the physical long portion of the radiating surface, this rotation may be at an edge or outside radiating surface 127, as long as the perpendicular line from radiating surface 128 is adjusted to an elevation 126.

Figure 2A:
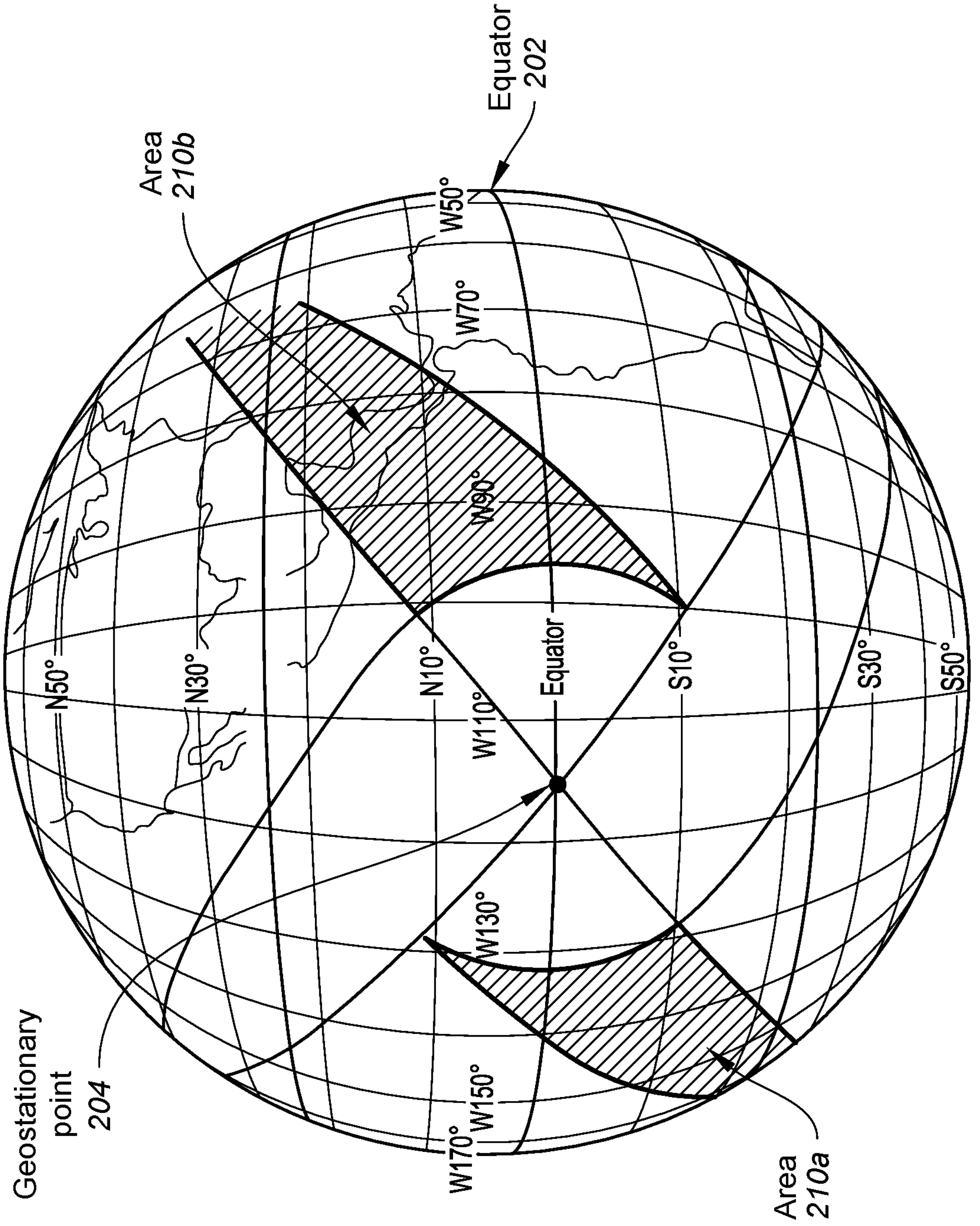
FIG. 2A illustrates an allowable antenna operation footprint of an embodiment of a satellite communications system for use with various embodiments of the innovations presented herein.
Figure 2C:
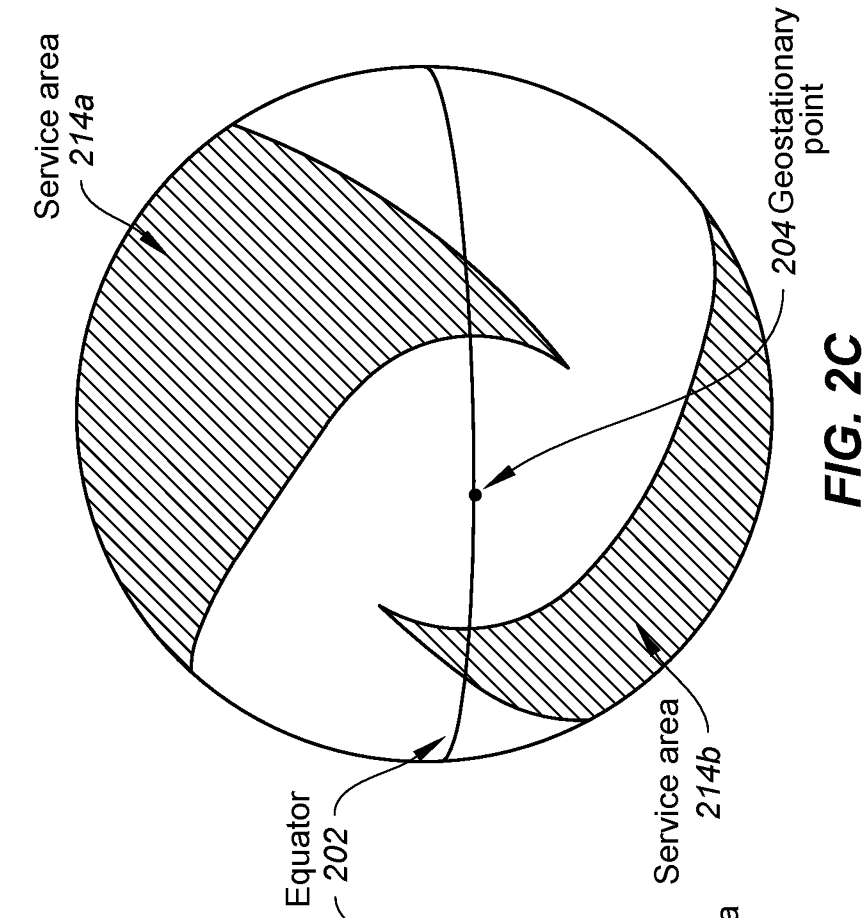
FIG. 2C illustrates an allowable antenna operation footprint of an embodiment of a satellite communications system for use with various embodiments of the innovations presented herein.
Figure 2B:
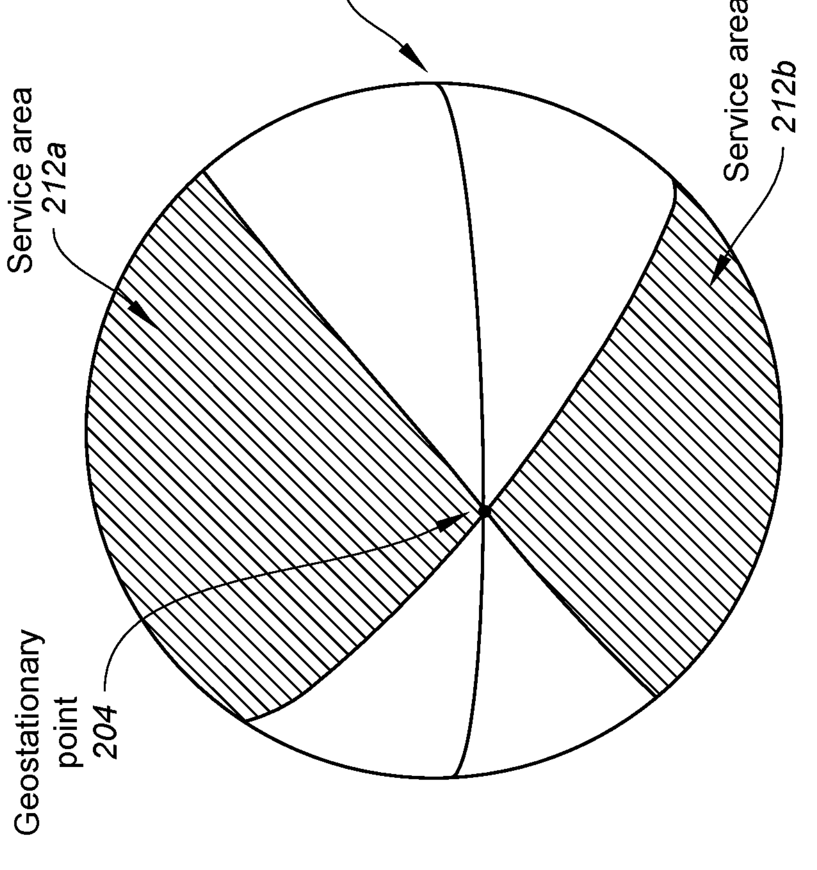
FIG. 2B illustrates an allowable antenna operation footprint of an embodiment of a satellite communications system for use with various embodiments of the innovations presented herein.
Figure 3A:
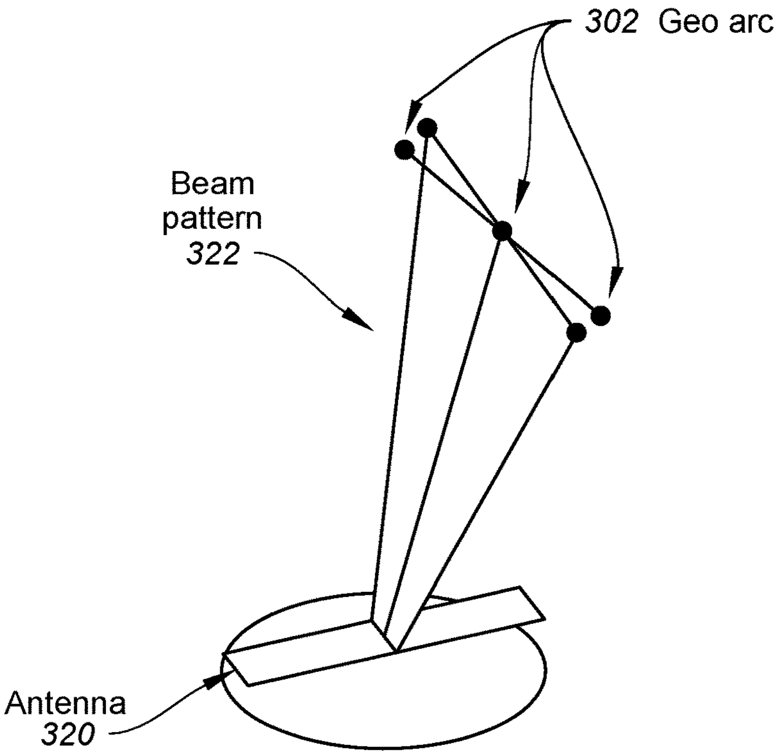
FIG. 3A illustrates a beam pattern from an asymmetric-aperture antenna in accordance with one potential embodiment.
Figure 3B:
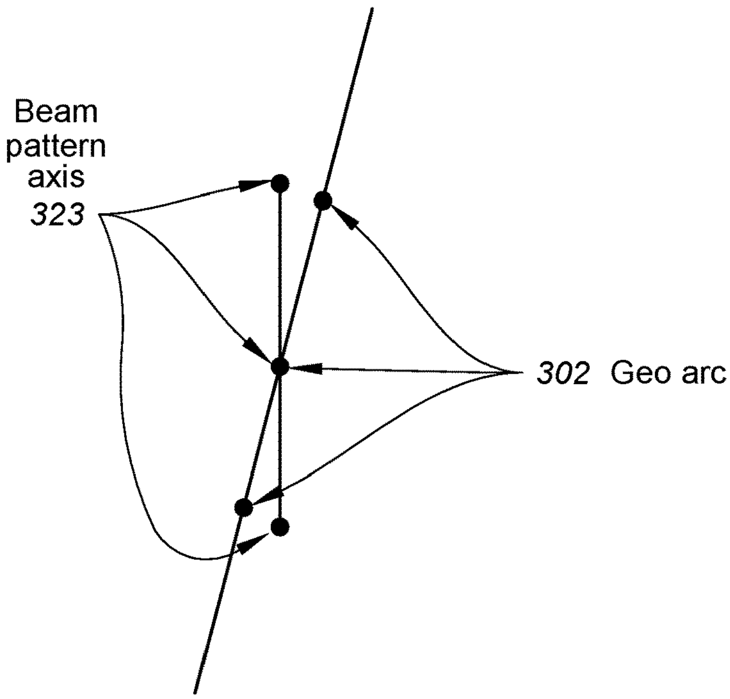
FIG. 3B illustrates a beam pattern from an asymmetric-aperture antenna in accordance with one potential embodiment.
Figure 3C:
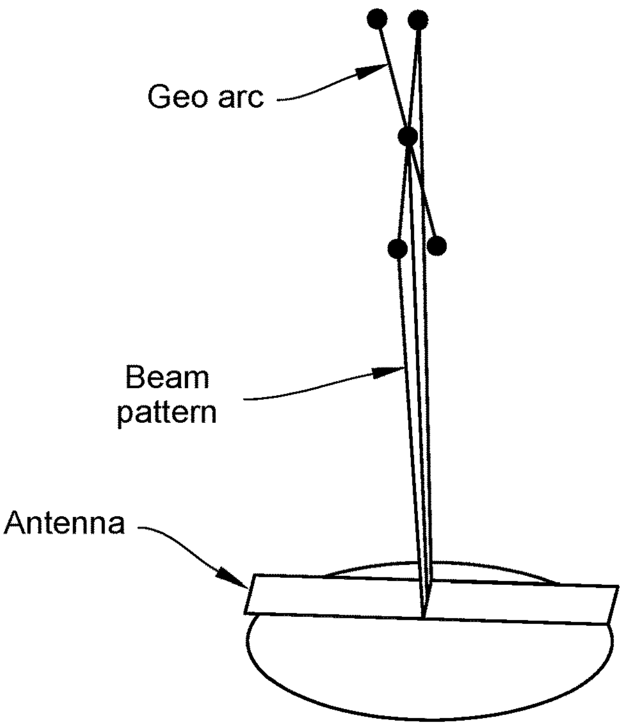
FIG. 3C illustrates a beam pattern from an asymmetric-aperture antenna in accordance with one potential embodiment.
Figure 3D:
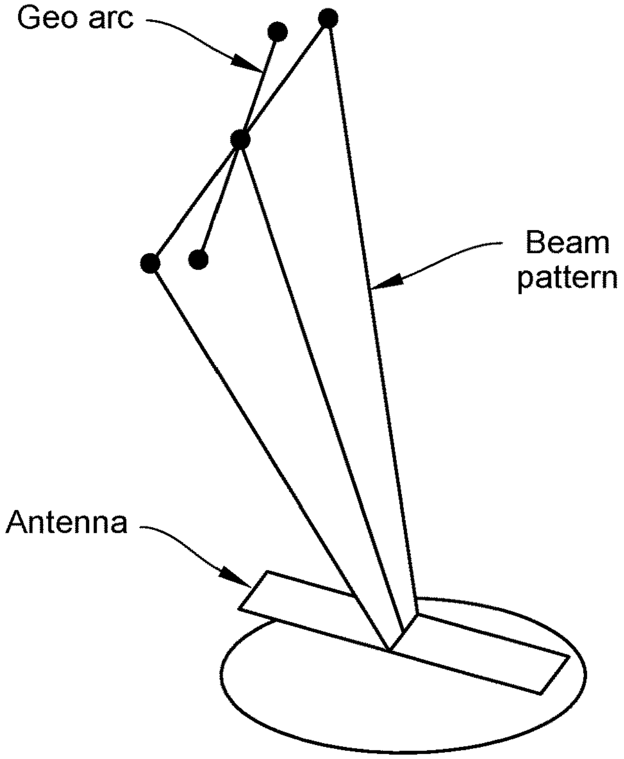
FIG. 3D illustrates a beam pattern from an asymmetric-aperture antenna in accordance with one potential embodiment.
Figure 3E:
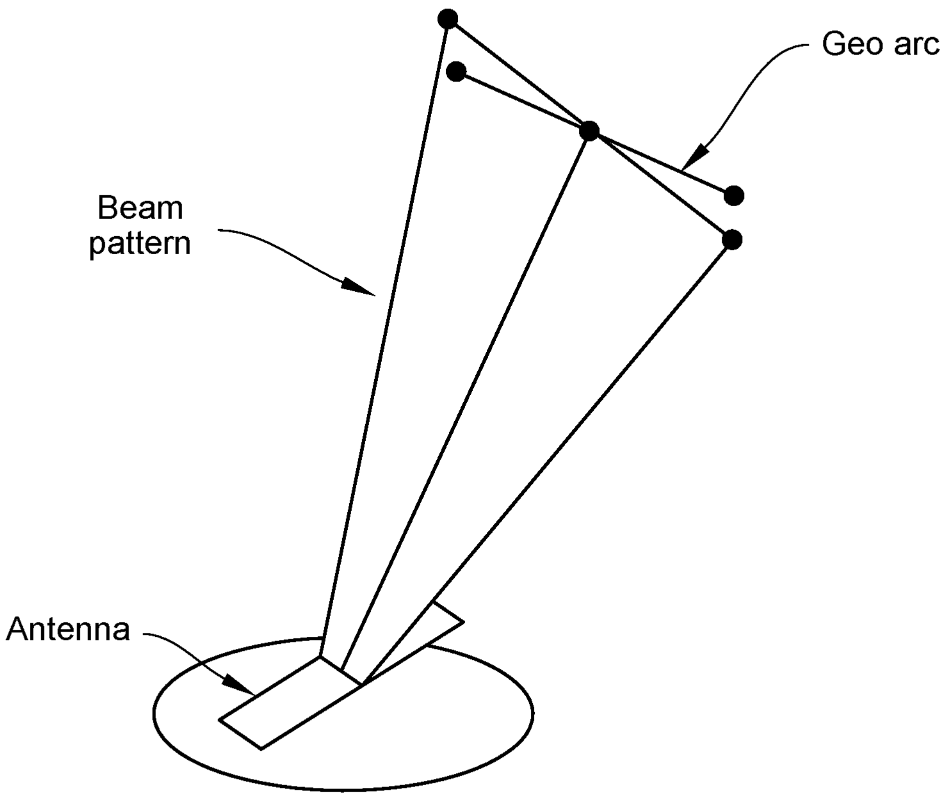
FIG. 3E illustrates a beam pattern from an asymmetric-aperture antenna in accordance with one potential embodiment.
Figure 4A:
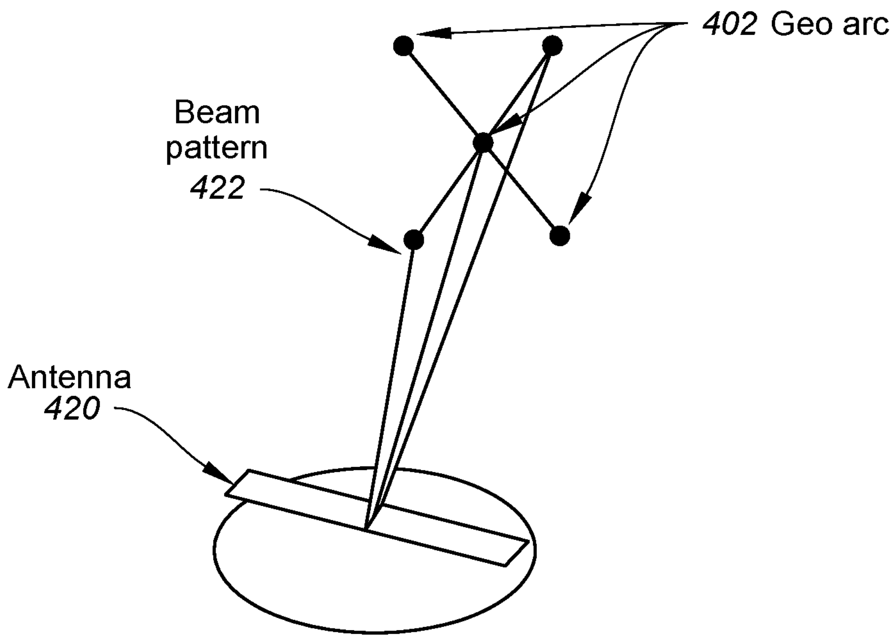
FIG. 4A illustrates a beam pattern from an asymmetric-aperture antenna in accordance with one potential embodiment.
Figure 4B:
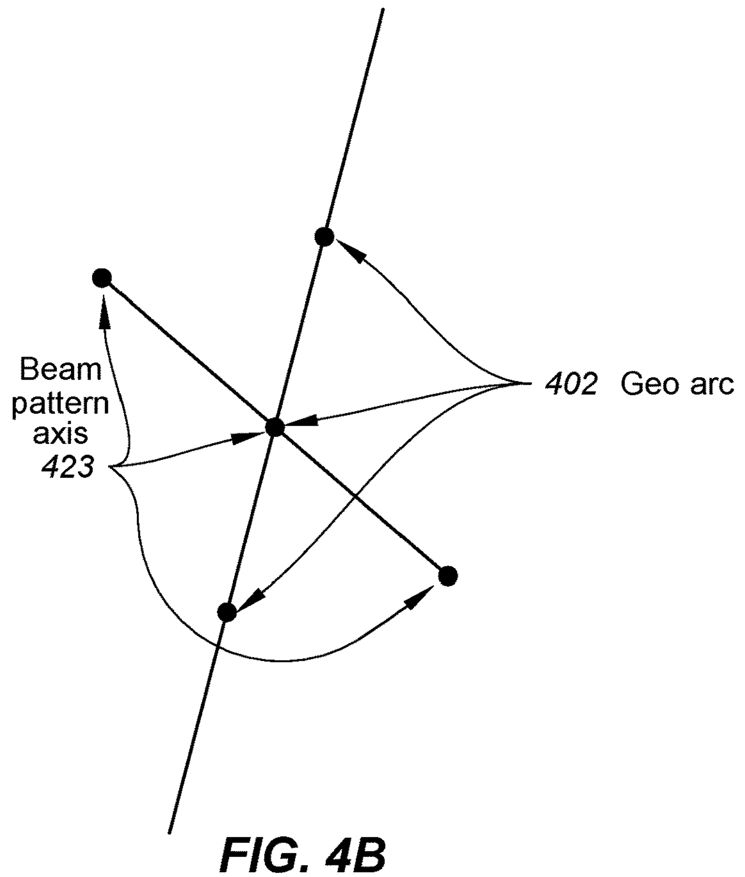
FIG. 4B illustrates a beam pattern from an asymmetric-aperture antenna in accordance with one potential embodiment.
Figure 4C:
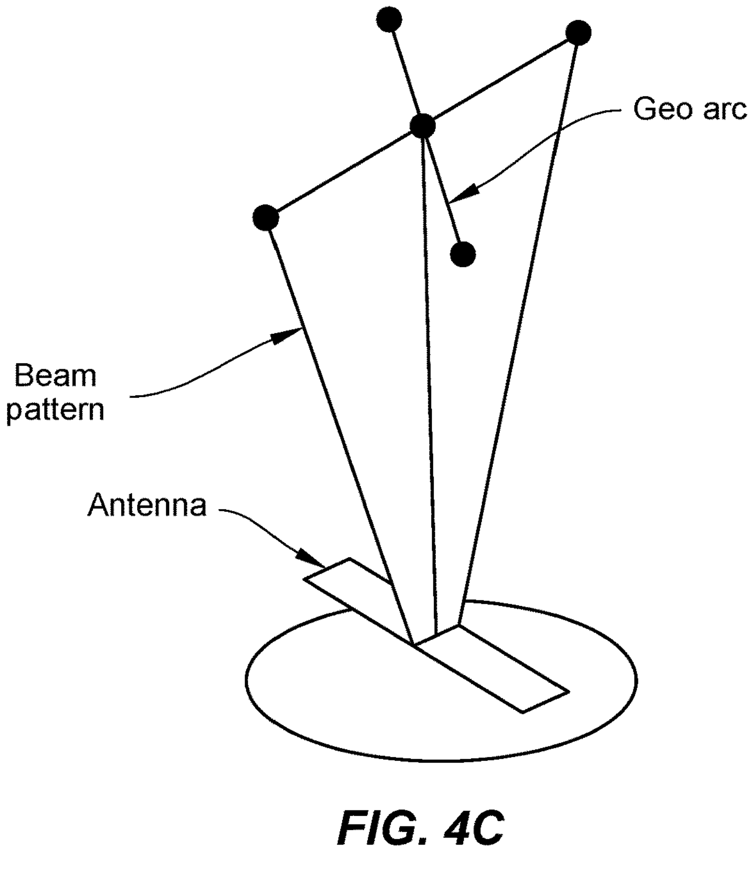
FIG. 4C illustrates a beam pattern from an asymmetric-aperture antenna in accordance with one potential embodiment.
Figure 4D:
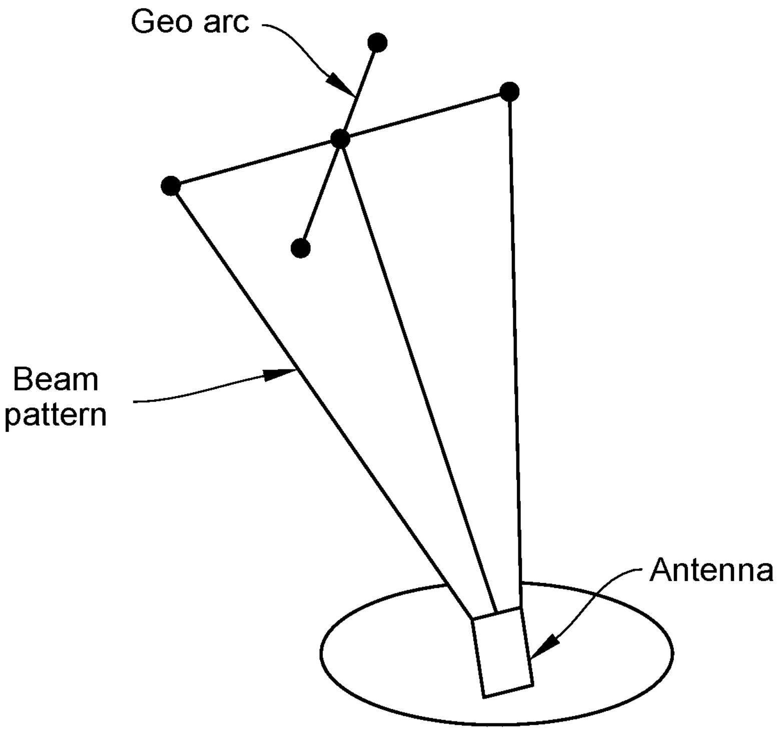
FIG. 4D illustrates a beam pattern from an asymmetric-aperture antenna in accordance with one potential embodiment.
Figure 4E:
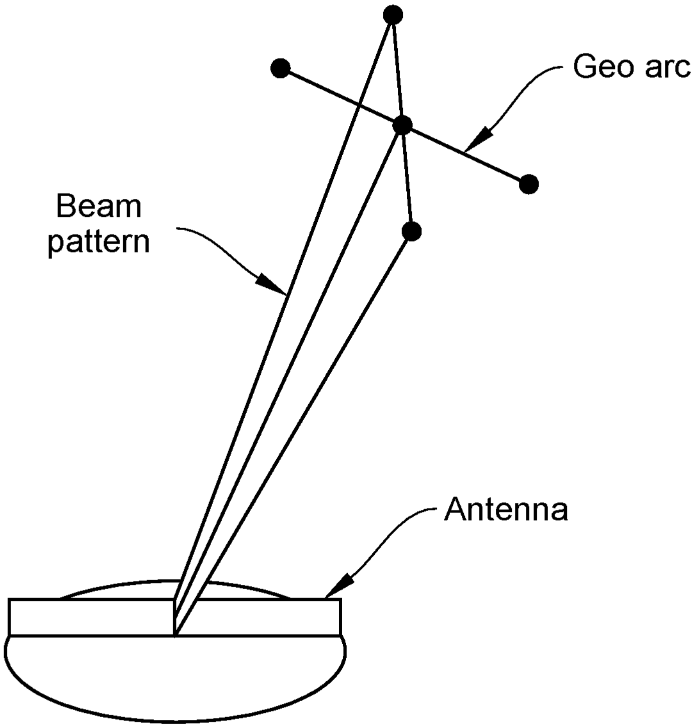
FIG. 4E illustrates a beam pattern from an asymmetric-aperture antenna in accordance with one potential embodiment.

FIGS. 2A, 2B, and 2C illustrate acceptable antenna placement areas for an antenna having a given set of antenna beam characteristics with no offset and with a first offset in the narrow beamwidth direction that is communicating with a target satellite above geostationary point 204.

FIG. 2A shows a map of the globe with geostationary point 204 along equator 202, illustrating areas 210*a* and 210*b* nearer to the equator 202 that may be acceptable areas for antenna operation for an antenna with an offset beam pattern. The service areas 212 and 214 may be determined by a combination of antenna characteristics, an antenna beam offset, satellite location, and regulatory standards that set interference levels and communication characteristics for two way communications with satellites.

FIG. 2B shows a service area 212 for an antenna with no beam pattern offset, and FIG. 2C shows a service area 214 for an antenna having a beam pattern offset. As shown in FIG. 2B, service area 212 provides a very minimal amount of coverage near equator 202. While an antenna with a beam pattern offset as shown by FIG. 2C does not include additional overall service area, service may be provided for a significantly greater area near the equator while maintaining significant service area away from the equator. As shown by FIG. 2A, such a system may enable an improvement for airplanes or boats traveling from North America to Central America in providing continuous two-way communication from a single asymmetric-aperture antenna to a single target satellite.

FIGS. 3 and 4 illustrate the relationship between a beam pattern and the geosynchronous arc for antennas at the same global surface location near the equator.

FIG. 3 illustrates the relationship between a beam pattern wide axis 323 and the geosynchronous arc for an antenna 320 with no beam pattern offset, from a multiple perspectives. FIG. 3A shows a side angle looking at antenna 320. FIG. 3B shows a top angle looking down through a target satellite toward antenna 320. FIGS. 3C, 3D, and 3E all show additional views of the same antenna 320.

FIG. 4 illustrates the relationship between a beam pattern wide axis 423 and the geosynchronous arc for an antenna 420 with a beam offset in the narrow beamwidth direction. The antenna illustrated in FIG. 4 is estimated for the same characteristics, same global surface location, and same geostationary satellite point as the satellite of FIG. 3. The difference is that the beam pattern wide axis 423 for antenna 420 has been offset in the narrow beamwidth direction, and the azimuth and elevation adjusted to direct the offset beam pattern toward the satellite. As seen in FIG. 3, when antenna 320 is located near the equator, the skew angle between the geo arc 302 and the beam pattern wide axis 323 is low, and so the signal from antenna 320 will have a greater interference with adjacent satellites. As seen in FIG. 4, this adjustment alters the skew angle between beam pattern wide axis 423 and geosynchronous arc 402 to create a greater angle. This reduces the amount of interference with adjacent satellites, and adjusts the locations for which operation is possible. When viewed with respect to FIG. 2, the areas in which the offset beam pattern more closely aligns with the geosynchronous arc can be seen, as well as area 210 where the beam pattern offset significantly improves the skew alignment between the beam pattern and the geosynchronous arc.

In various alternative embodiments, the offset angle may be implemented in an asymmetric-aperture antenna in different ways. In one potential embodiment, a fixed offset angle is built into the design of the antenna. In such an embodiment, an offset may be mechanically or electrically set in the antenna design in a non-adjustable format, such that a narrow beamwidth offset angle such as offset angle 129 of FIG. 1 cannot be adjusted during operation. This could enable use of the antenna over a different footprint with respect to the satellite than an antenna with no offset would, potentially at a lower cost than adjustable designs, with the disadvantage that the antenna would be footprint-specific.

Another potential embodiment may use a stepwise-steerable one dimensional phased array. This allows more flexibility in the use of the antenna across all regions. The disadvantage is a more complex antenna design. Dependent on the specific embodiment, this may or may not involve a larger swept volume or longer beamwidth axis. Multiple alternative methods of steering the antenna beam in such an embodiment are possible. One potential embodiment to accomplish the desired steerability would be to use a Rotman lens and associated switches. A Rotman lens has the advantage of being a printed structure, without any active elements other than an array of switches to select which port is active. In such an embodiment the lens may be attached to a modified antenna such as antenna 120 of FIG. 1 without increasing its swept volume.

An additional potential alternative embodiment may use an electronically steerable phased array as the radiating surface. Such an embodiment may be steerable only in the narrow beamwidth direction, or may be steerable in two dimensions. Such an embodiment would have the advantage of not being limited to a small set of quantized offset angles. Since the range of offset angles is smaller than for a standard phased array, and since only a single dimension is controlled, implementation issues seen in a phased array embodiment may be eased.

Variations and alternative embodiments of implementing an offset beam will also be apparent from the descriptions provided herein.

For a single antenna with a fixed beam offset or a steerable beam offset, the two way communication may then function as follows. The asymmetric aperture antenna will include a radiating surface, a gimbal with an azimuth adjustment and an elevation adjustment; and a signal source that provides a signal to the radiating surface. The beam offset may be fixed or controllable as described above based on the mechanism for providing a signal from a signal source to the radiating surface. The beam offset thus essentially describes an offset from a perpendicular of the radiating surface at which an offset antenna beam pattern radiates. The offset beam pattern is set or fixed to reduce interference with an adjacent satellite when the gimbal directs the antenna beam pattern toward a target satellite.

For controllable beam offsets, the beam offset may be programmed or set in conjunction with control circuitry that may adjust the beam offset over time as the antenna moves, in order to minimize interference with adjacent satellites while maintaining acceptable transmission and reception characteristics. Such a system may include a positioning system that uses satellite global positioning signals to determine the appropriate offset, or may receive a signal from navigation systems of the vehicle on which the antenna is mounted. In such embodiments, the antenna may include or be coupled with a local computing device that stores instructions for antenna operation, such as the computing devices described in FIG. 6.

In still further embodiments, one or more asymmetric-aperture antennas having a beam offset as described herein may receive control information via a remote or wide area network. In some embodiments, for example, an initial communication protocol may establish an initial satellite communication using a first protocol that avoids adjacent satellite interference but using a lower bandwidth communication. Instructions for a beam pattern offset may then be received for the appropriate beam offset for communicating with a target satellite, and additional instructions for controlling the beam offset may be received via the target satellite. Such instructions may be updated over time by the target satellite or the initial communication means if communication with the target satellite is lost. Control circuitry that sets the beam offset may then be programmed or structured to set an appropriate beam offset to reduce adjacent satellite interference.

Figure 5:
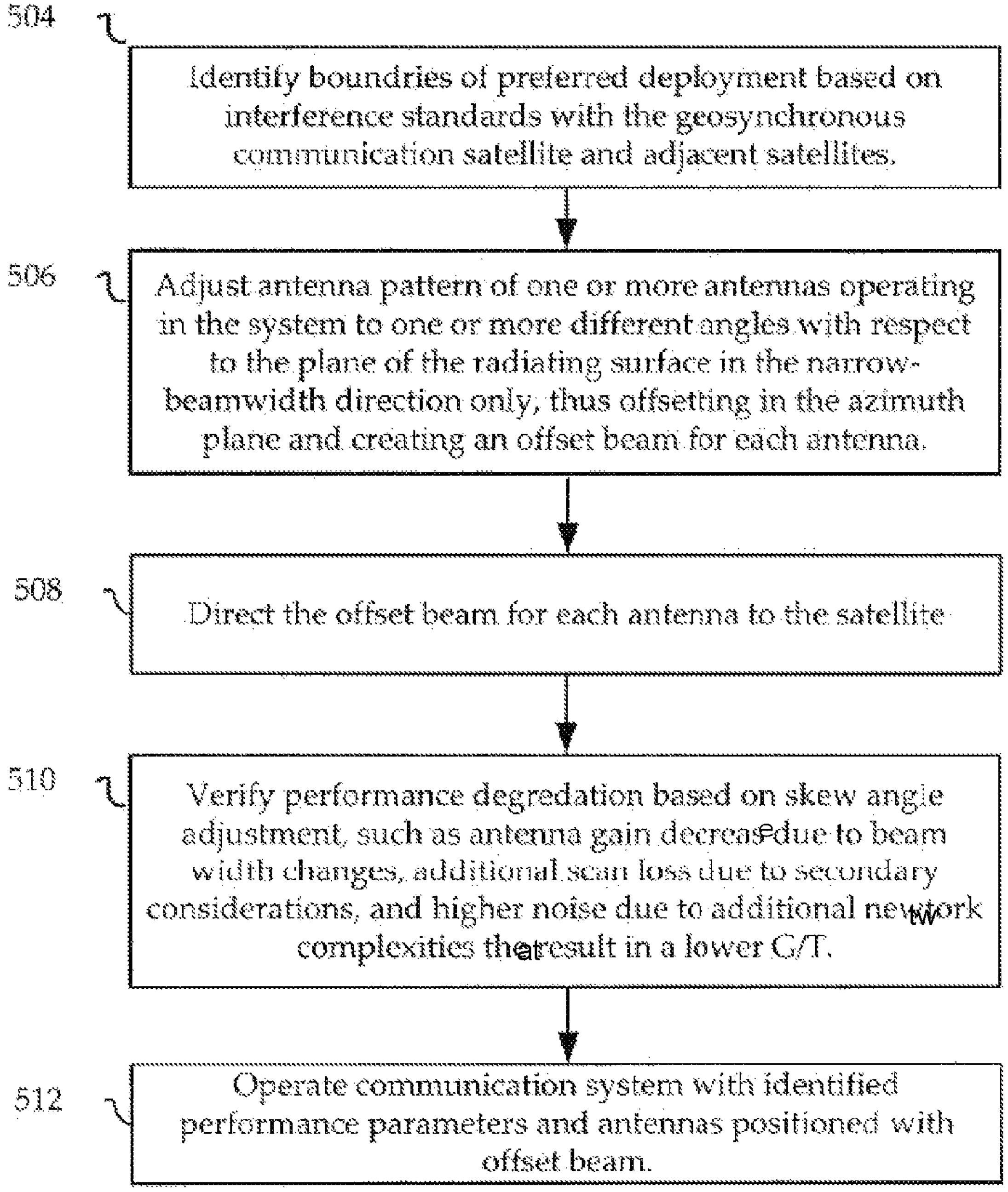
FIG. 5 shows a one potential method of operating a satellite communications system in accordance with an embodiment.

Further still, in certain embodiments, networks of multiple asymmetric aperture antennas may be controlled remotely or in a hybrid manner, with certain local controls and certain centralized and synchronized remote network controls from a system of multiple antennas. FIG. 5, for example, illustrates one potential method of implementing a system of multiple asymmetric-aperture antennas according to one potential embodiment.

In 504, boundaries of preferred deployment are identified based on interference standards that may be governmental standards or communication system quality standards, are identified for one or more satellites and the adjacent satellites for each satellite. As such, a system may be not only for a single target satellite, but for multiple target satellites and antennas associated with each satellite. In certain embodiments, a single antenna may communicate with multiple target satellites, with a different beam offset for each satellite, for example.

In 506, The antenna beam pattern for one or more antennas operating in the system are adjusted to one or more different beam angles as described above in detail. The beam patterns are adjusted to offset angles with respect to the plane of the radiating surface in the narrow beamwidth direction, thus offsetting the beam in the azimuth direction, and creating an offset beam for each antenna. In certain embodiments, the offset is in the narrow beamwidth only, with no elevation offset in the wide beamwidth direction. In other embodiments, the offset may be in two directions, both the wide and narrow beamwidth directions.

Following this, in 508 a gimbal mechanism of the asymmetric-aperture antenna that adjusts the position of the radiating surface to direct the offset beam to the appropriate target satellite. For certain embodiments, such as embodiments with a fixed and set beam pattern offset, the method of operating the system may then simply be set, with no additional variation.

In the embodiment of FIG. 5, 510 follows with a feedback step, where actual performance degradation from the skew angle adjustment that creates the offset beam pattern may be measured or calculated. One potential performance degradation is a loss in antenna gain due to the beam width changes. Additionally, higher scan loss may occur due to secondary considerations with the offset beam pattern, and the system may have higher noise due to additional network complexities. This may additionally be compensated for during calculation of the offset. In various embodiments, the selected offset for a given antenna, group of antennas, or antenna in a particular position may be determined not only based on the interference reduction from the offset beam pattern, but also based on any performance degradation.

Finally, in 512, the two-way communication system operates with communications between one or more satellites and the one or more asymmetric-aperture antennas using the antennas with offset beams and any additional performance parameters to operate the system.

Figure 7:
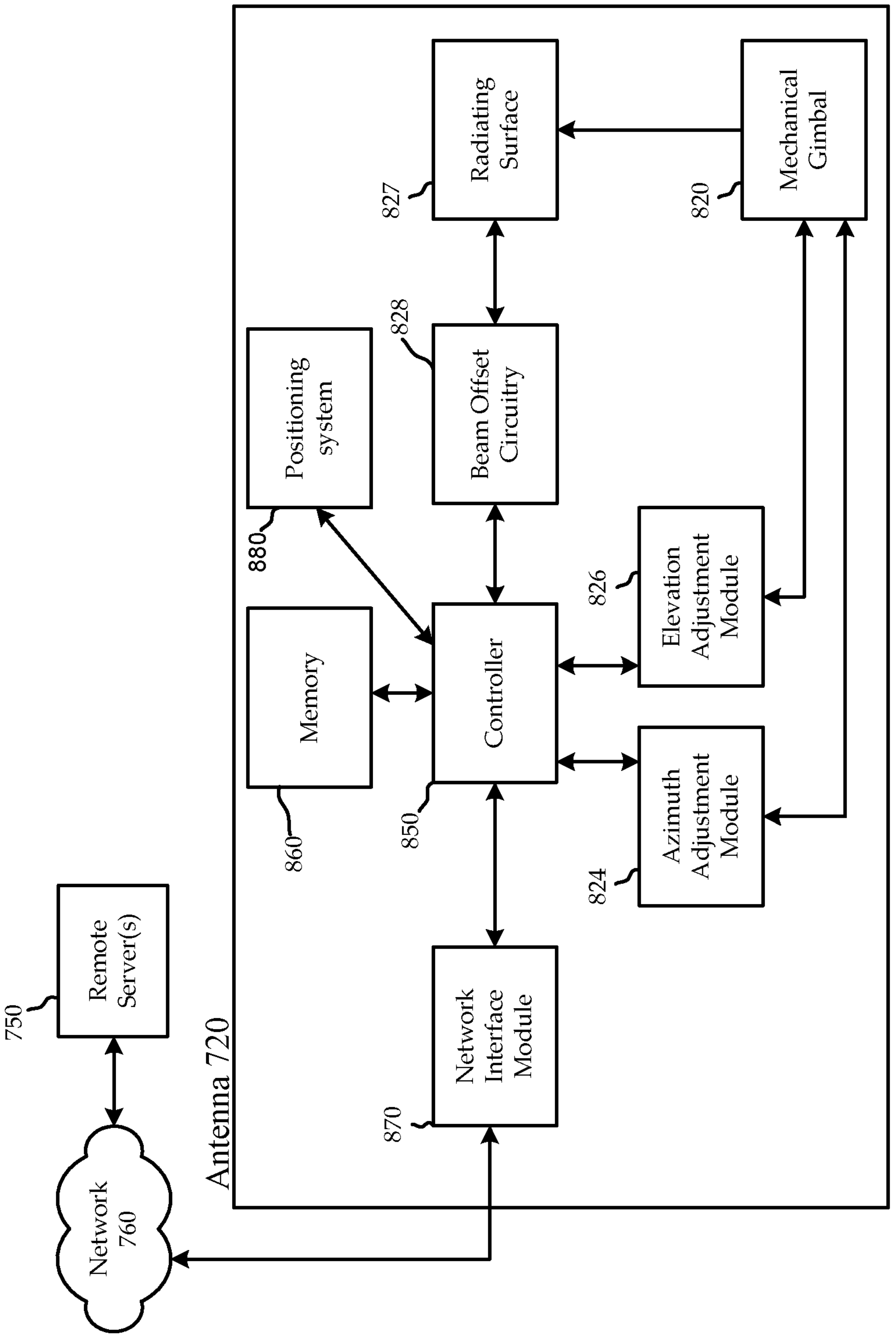
FIG. 7 shows a one aspect of an embodiment of an asymmetric-aperture antenna in accordance with various embodiments of the innovations presented herein.

FIG. 7 describes one potential implementation of an antenna control system according to one embodiment. FIG. 7 includes antenna 720, remote server 750, and network 760. Antenna 720 includes controller 850, memory 860, network interface module 870, sensors 880, beam offset circuitry 828, azimuth adjustment module 824, elevation adjustment module 826, mechanical gimbal 820, and radiating surface 827.

Sensors 880 may be any local transceiver or information gathering device that may be used by the antenna 720 to determine information relevant to the setting of the beam direction from radiating surface 827 and the mechanical gimbal 820. For example, sensors 880 may include location services such as a global positioning device that determines a current location of antenna 720. In an alternative embodiment, sensors 880 include an inertial reference unit (IRU) that determines a vehicle location and/or orientation.

Controller 850, memory 860, and network interface module 870 may function as electronic control components, as described in additional detail in FIG. 6 below. These components may serve to implement control instructions to set the direction and beam properties of radiating surface 827 of antenna 720 using beam offset circuitry 828, azimuth adjustment module 824, and elevation adjustment module 826. Mechanical gimbal 820 may be physically coupled to radiating surface 827 such that as the components of mechanical gimbal 820 adjust and move, the radiating surface 827 is directed to the appropriate location. Elevation adjustment module 826 and azimuth adjustment module 824 may receive electronic control signals to direct the mechanical gimbal 820 to move radiating surface 827 to this appropriate location. The two adjustment modules may receive instructions related to the appropriate settings from controller 850. These settings may be from a control program stored in memory 860, or may be received from remote server 750 via network 760 and network interface module 870 if the antenna is being controlled from a server remotely.

For example, in the embodiment of FIG. 1 with satellite 110, adjacent satellites 112*a* and 112*b*, and asymmetric aperture antenna 140, regulatory standards may set a maximum amount of signal that may be directed from asymmetric aperture antenna 140 to adjacent satellites 112*a* and 112*b*. Such information may be used to create a predetermined adjacent satellite interference threshold. Thus, in such a system where antenna 140 includes the internal antenna structure of antenna 720, memory 860 may store location details for satellite 110 and adjacent satellites 112*a* and 112*b*, along with the value for the adjacent satellite interference threshold.

Additionally, for an asymmetric-aperture antenna mounted to an airplane such as antenna 140, controller 850 may continually update a position of the antenna 140. Memory 860 may also include antenna beam characteristics associated with antenna 140. The current location of the antenna 140 along with the stored information for satellite 110 will enable the controller 850 to calculate the central vector for the antenna beam pattern to point at satellite 110. This may be done approximately by, for example, using a look-up table stored in memory 860 or this calculation may be performed using the stored location data. The antenna beam characteristics stored in memory 860, along with the current position of the antenna 140 and the locations of adjacent satellites 112*a* and 112*b*, will enable controller 850 to calculate a beam offset angle and new azimuth and elevation angles that will place the adjacent satellite interference below the adjacent satellite interference threshold. The angles may be precomputed and the results stored in a table, to be looked up as needed in real time. Alternatively, the calculation itself may be done in real time.

Once the controller calculates the beam offset angle, the beam offset circuitry 828 controls an input to radiating surface 827 to set the corresponding beam offset angle during operation. If the antenna is a phased array antenna, the beam offset circuitry 828 will set antenna element phases to accomplish the desired offset. Alternatively, if the antenna is stepwise steerable, the beam offset circuitry 828 will select a desired offset from the available steps. As an example in one potential embodiment, this may be done by setting appropriate switches associated with the antenna to select the beam offset angle. In association with the change in offset angle by the beam offset circuitry 828, the controller 850 directs azimuth adjustment module 824 and elevation adjustment module 826 to control the mechanical gimbal 820 such that the central vector for the offset antenna beam pattern points at satellite 110. During operation, this process may be repeated continuously or at predetermined time or location increments, so that as the vehicle associated with antenna 140 travels, the adjacent satellite interference may remain within the acceptable threshold.

In additional alternative embodiments, calculation of the settings may be performed by remote servers such as remote server 750, and communicated via network 760. In further embodiments, any of the modules or components described in antenna 720 may be implemented as separate components or may be integrated together. Additionally, the modules, memory, controller, and sensors of an antenna may be disposed separately from an antenna and coupled communicatively to the physical components of the antenna.

In certain embodiments, beam offset circuitry 828 may comprise electronic control of an antenna signal to create the offset beam pattern. In alternative embodiments, beam offset circuitry 828 may comprise electronic control of a physical component of the antenna, where altering the physical component of the antenna creates the beam offset pattern. In further alternative embodiments, beam offset circuitry 828 may comprise a fixed mechanical structure in the system that is not electronically controllable and which sets a fixed beam offset. In such embodiments, the system may be created to calculate the adjacent satellite interference, and to halt antenna transmissions when the adjacent satellite interference exceeds an adjacent satellite interference threshold.

Figure 8:
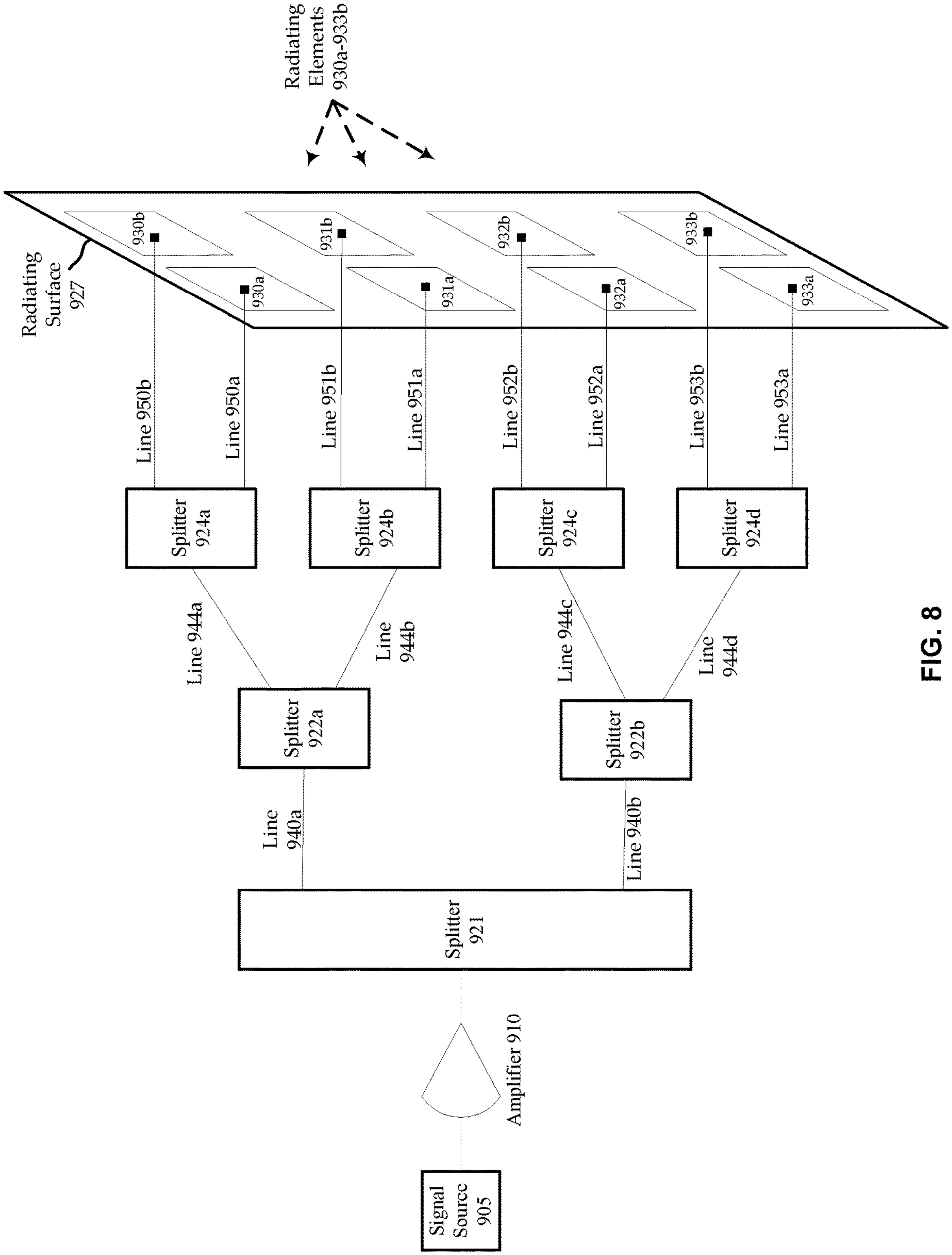
FIG. 8 shows a one aspect of an embodiment of an asymmetric-aperture antenna in accordance with various embodiments of the innovations presented herein.

FIG. 8 describes one potential implementation of elements of an low profile asymmetric-aperture antenna according to certain embodiments. FIG. 8 may, in certain embodiments, show elements that may function as beam offset circuitry 828 and radiating surface 827. FIG. 8 includes signal source 905, amplifier 910, a radiating surface 927, and a plurality of splitters 921, 922*a-b*, and 924*a-d*. Radiating surface 927 comprises a plurality of radiating elements 930*a*-933*b*. Signal source 905 is connected to each of the plurality of radiating elements by various combinations of lines 940*a-b*, 944*a-d*, 950*a-b*, 951*a-b*, 952*a-b*, and 953*a-b*.

Signal source 905 may be any source that provides information to be transmitted by the antenna using radiating surface. For example, signal source 905 may be a modem that includes modulation and demodulation functionality for communicating information to a satellite via a radiating surface. In various embodiments this may be part of a multi-purpose controller that implements antenna control and signal communication systems such as communication subsystem 630 of FIG. 6 or controller 850 of FIG. 7. In alternate embodiments, a specialized modem module may be implemented as signal source 905. Amplifier 910 may be a power amplifier that accepts information for transmission and amplifies the signal to a sufficient strength to be communicated to a target satellite using radiating surface 927. The circuitry between amplifier 910 and radiating surface 927 may then function both to provide the signal to the radiating elements of radiating surface 927, and also to set an offset for the radiating beam. As described above, this offset may be created by a variation in the phase of signals arriving at the radiating elements, such that a constant gradient of signal phase is presented across a planar array of radiating elements. The embodiment of FIG. 8 shows a 2 by 4 array of radiating elements in columns a and b and rows 930-933. In alternate embodiments, any number of one or more radiating element columns or two or more radiating element rows may be structured according to various embodiments. At least two radiating elements are required along the long axis of the radiating surface to enable the offset in the narrow-beamwidth direction.

Lines 940*a-b*, 944*a-d*, 950*a-b*, 951*a-b*, 952*a-b*, and 953*a-b* may then be fixed to determine the offset in the narrow-beamwidth direction from the perpendicular of the radiating surface. This may be done by adjusting the difference in electrical path length from amplifier 910 to each row of radiating elements. Thus, the path including line 940*a*, line 944*a*, and line 950*a* may have an electrical path length "L". The final lengths to each row may have a same length, with line 950*b* having the same electrical length as line 950*a* so that the phase at radiating elements 930*a* and 930*b* is the same. Similarly the lengths of lines 951*a-b* are the same, the lengths of lines 952*a-b* are the same, and the lengths of lines 953*a-b* are the same, so that each row of elements has the same phase offset. The path including line 940*a*, line 944*b*, and line 951*a* may have a length "L+a". The path including line 940*b*, line 944*c*, and line 952*a* may have a length of "L+2a." The path including line 940*b*, line 944*d*, and line 953*a* may have a length of "L+3a." The value of "a" may set the constant gradient of phase across the array, and may thus set the beam offset in the narrow-beamwidth direction. Any number of combination of line lengths for lines 940*a-b*, 944*a-d*, 950*a-b*, 951*a-b*, 952*a-b*, and 953*a-b* may be set to achieve this result. In certain embodiments, the offset and associated constant gradient of signal delays is set by a total length of the transmission lines for each electrical path of the plurality of electrical paths, while in other embodiments, delay components may be included in certain lines to achieve the desired offset at certain radiating elements independent of a physical length of the transmission lines.

The embodiment above thus describes an antenna with a fixed beam offset in the narrow-beamwidth direction only. In alternate embodiments, a phase difference between radiating elements in the same rows may be included that sets a beam offset in the-wide beamwidth direction. This may influence loss calculations for embodiments where the loss is optimized against the adjacent satellite interference. The adjacent satellite interference, however, is reduced only by the offset in the narrow beam width direction.

Figure 9:
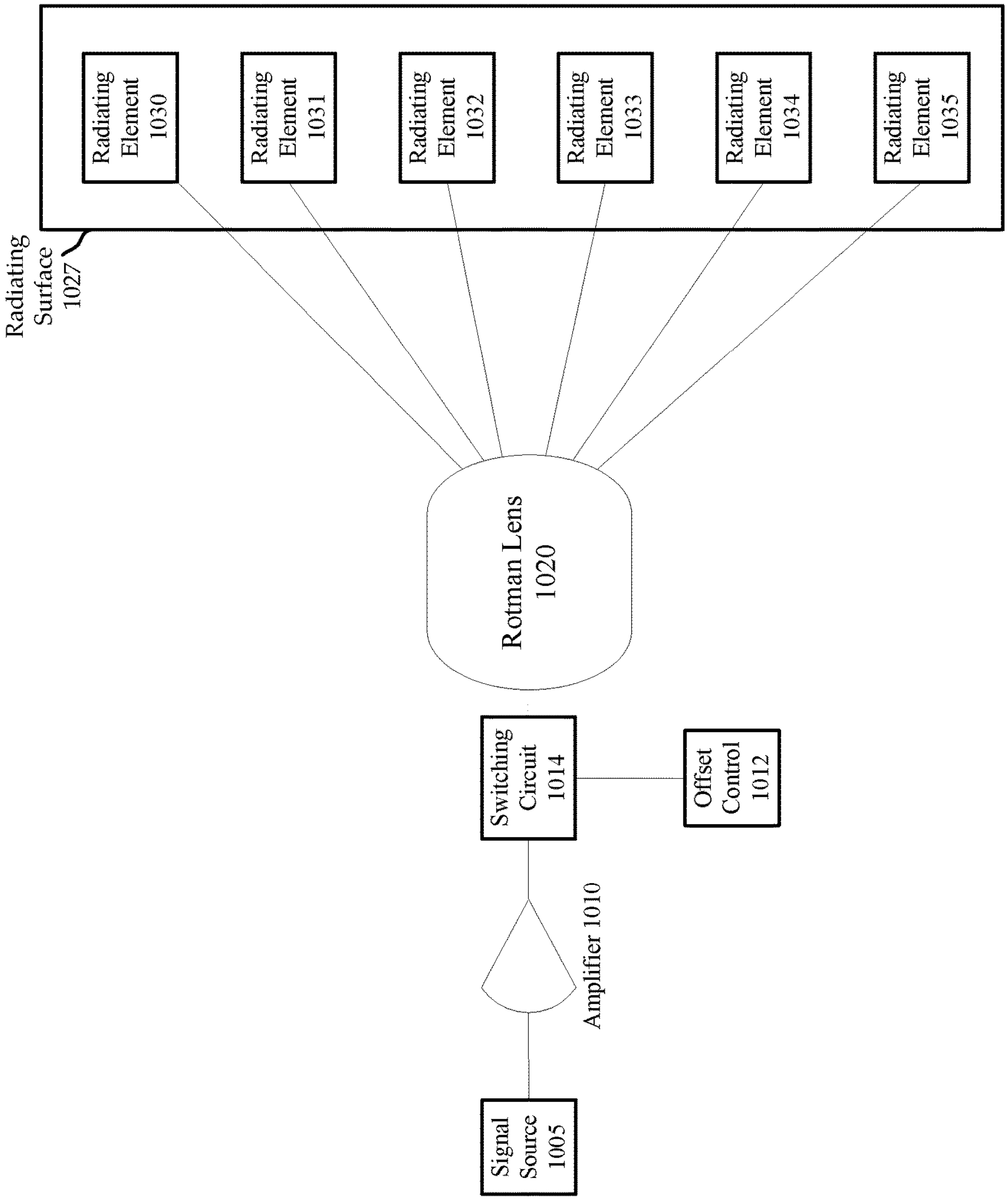
FIG. 9 shows a one aspect of an embodiment of an asymmetric-aperture antenna in accordance with various embodiments of the innovations presented herein.

FIG. 9 shows an additional alternative implementation of an antenna according to various embodiments. While the embodiment of FIG. 8 shows a fixed offset antenna that is determined by the electrical path lengths of lines delivering signals to each radiating element, the embodiment of FIG. 9 shows one potential implementation of an antenna with an adjustable beam offset. FIG. 9 includes signal source 1005, amplifier 1010, switching circuit 1014, offset control 1012, Rotman Lens 1020, and radiating surface 1027. Radiating surface 1027 comprises a plurality of radiating elements 1030 through 1035 as shown. signal source 1005 and amplifier 1010 may function similarly to the source and amplifier described above in FIG. 8. At the output of amplifier 1010, however, the signal is input into a switching circuit 1014. The switching circuit selects between a plurality of input ports to Rotman lens 1020. Each port of the plurality of input ports to Rotman lens 1020 selects a different set of delays for the signal from signal source 1005 to each radiating element of radiating surface 1027. This enables the switch 1014 to select from a set of predetermined offsets in the narrow beamwidth direction for a beam radiated from radiating surface 1027.

Thus, while the example of FIG. 8 shows a single set of signal delays to each radiating element, the example of FIG. 9 may include multiple sets of signal delays to each radiating element. Each set of signal delays is associated with a different constant gradient of signal delays that sets a different beam offset. Offset control 1012 may then select the different beam offsets to adapt to different needs for reducing adjacent satellite interference. This may enable a single antenna to operate in different systems where a plurality of antennas in a system communicating with a specific target satellite all have the same offset in the narrow beamwidth direction. Alternatively, this may enable a single antenna to switch between adjacent satellite interference settings depending on different operating modes within a single system. As described above, these selections by offset control 1012 may be made by an application or module operating on a controller or processor of an antenna, or the selections may be received from a remote computing system using a wireless communication, as shown in FIG. 7.

Figure 10:
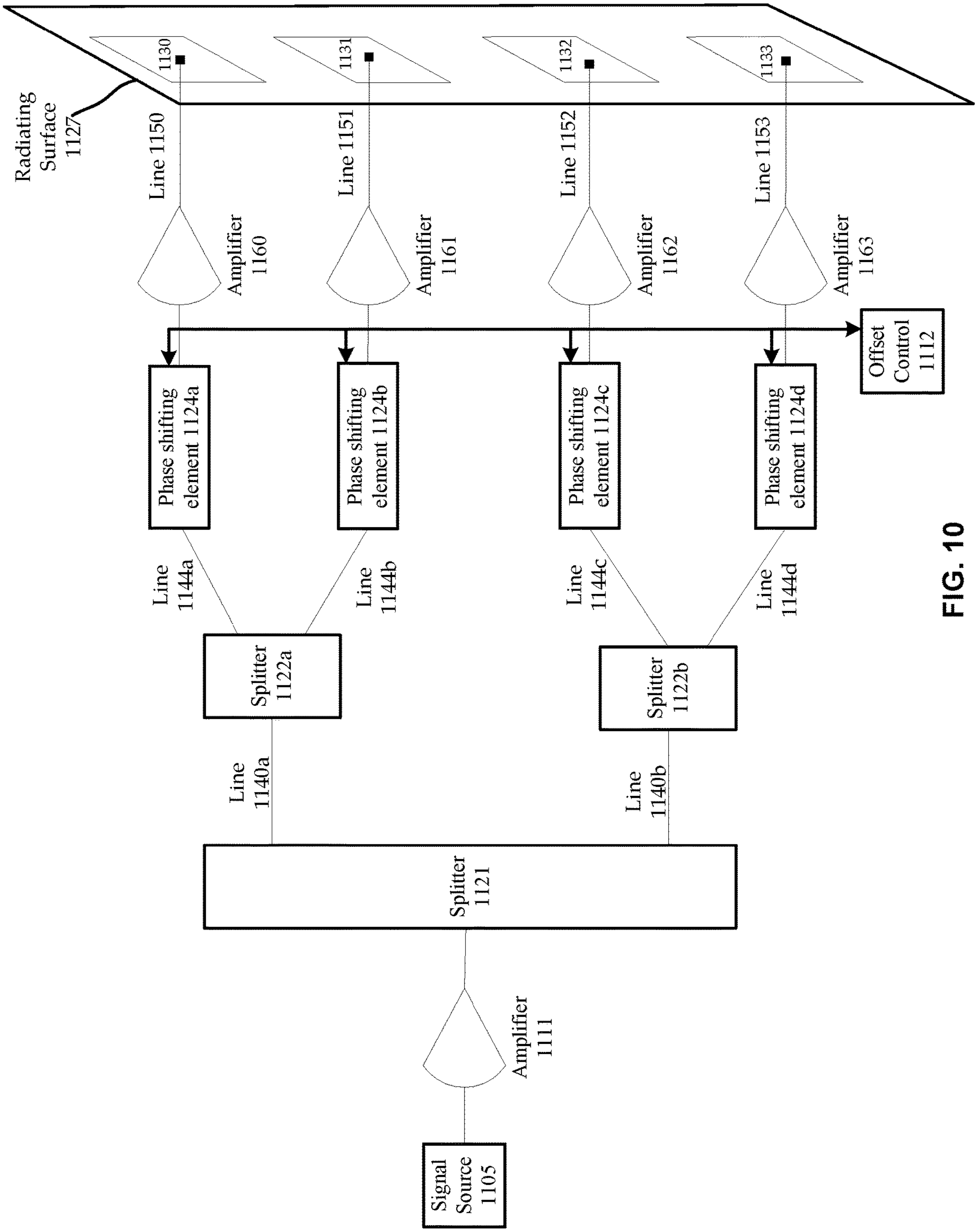
FIG. 10 shows a one aspect of an embodiment of an asymmetric-aperture antenna in accordance with various embodiments of the innovations presented herein.

FIG. 10 shows one potential embodiment of an electronically steerable one dimensional phased array that may be used to set an offset in the narrow beamwidth direction of an asymmetric aperture antenna having a radiating surface 1127 with a one dimensional array of radiating elements 1130-1133. FIG. 10 further includes signal source 1105, amplifier 1111, splitters 1121, 1122*a*, and 1122*b*, along with phase shifting elements 1124*a-d*, amplifiers 1160-1163, and offset control 1112. The various elements are connected by lines 1140*a-b*, 1144*a-d*, and 1150-1153. Signal source 1105, amplifier 1111, radiating surface 1127, and splitters 1121, 1122*a*, and 1122*b* may be similar to the corresponding components found in FIGS. 8 and 9. Amplifiers 1160-1163 may be connected to radiating elements 1130-1133 in order to deal with various design considerations, such as power limitations or a loss in phase shifting elements and splitters, or to deal with non-linear effects in the circuitry that delivers signals to individual radiating elements.

The antenna of FIG. 10 includes phase shifting elements 1124*a*-1124*b*. Offset control 1112 may electronically set a phase shift associated with each phase shifting element 1124, so that the phase shift associated with each element may be electronically controlled to change over time. Thus, the gradient of phase differences achieved by the phase at each individual radiating element of the plurality of radiating elements 1130-1133 may be electronically adjusted. The fineness of the control may depend completely on the detail of the phase shift allowed in the phase shifting elements 1124, but may enable a control to small fractions of a degree in the offset from the normal in the narrow beamwidth direction. As shown in FIG. 10, radiating surface only includes a single column of radiating elements. In such an embodiment, the offset of the beam may only be in the narrow beamwidth direction, because there is no phase difference across any rows that would set an offset in a wide beamwidth direction. In embodiments with a two dimensional array of radiating elements, the offset may be structured to be controllable in the wide-beamwidth direction as well as the narrow beamwidth direction if each radiating element, including radiating elements in the same row, each have a separately controllable phase shifting element. In alternative embodiments, a single phase shifting element may be assigned to an entire row, with splitters following the phase shifting elements to connect signal lines to radiating elements in the same row, in order to structure a two dimensional array of radiating elements in asymmetric aperture antenna with an electronically steerable offset control in the narrow beamwidth direction only.

Thus, while in the antenna of FIG. 8 the offset is fixed by the electrical path lengths to each radiating element, and in FIG. 9, a limited number of offsets are fixed by the design of the Rotman lens, in FIG. 10, a large number of continuous offsets may be controlled at set by a processor of the antenna or by a remote control system that may be in a different location than the antenna, where a remote server 750 may update and set the offset along a finely defined electronically controlled offset setting. In other embodiments, a computing element coupled to an antenna may calculate inter satellite interference in different situations, and use offset control 1112 to set an acceptable offset to match specifically calculated inter satellite interference thresholds.

While three specific examples of antennas that may have an beam offset from the perpendicular of a radiating surface in the narrow beamwidth direction are described above, with one example of a fixed offset shown in FIG. 8, one example of a stepwise-steerable offset using a Rotman lens shown in FIG. 9, and one example of an electronically steerable offset using phase shifting elements, other designs may function to create such an offset which may be used to reduce inter satellite interference. For example, alternative embodiments may use multiple Rotman lenses in a single antenna, or may use other electronically adjustable means for steering the beam offset. Additional embodiments may include other embodiments of electronically steerable phased arrays for an asymmetric aperture antenna that is steerable in the narrow beamwidth direction. Any potential such antennas may be used in a system for reducing adjacent satellite interference in accordance with different embodiments.

Further still, while the embodiments herein may be described with respect to interference in transmission from a radiating surface to a satellite to avoid interference with an adjacent satellite, similar embodiments may be used to reduce interference from an adjacent satellite when receiving a signal from a target satellite. For example, in a receiver of the antenna shown in FIG. 10, a controller analyzing received signals may determine that interfering signals from a satellite adjacent to a target satellite is causing an excessive number of errors in the signal received from the target satellite. The antenna may then adjust phase shifting elements on lines from an array of receiving elements which may be the same as the radiating elements. This may adjust an offset in the narrow beamwidth direction for a received signal, which reduces the received signal from the adjacent satellite when a mechanical gimbal directs the offset receiving beam toward the target satellite. This receiving beam, which may be considered a receiving beam pattern similar to the transmit beam pattern described above, the receiving beam pattern being of sensitivity for received signals at an antenna surface, may thus be adjusted to reduce inter satellite interference for received signals by setting phase on the receiving lines to offset the receiving beam in the narrow beamwidth direction, and by then directing this receiving beam toward the target satellite.

Figure 6:
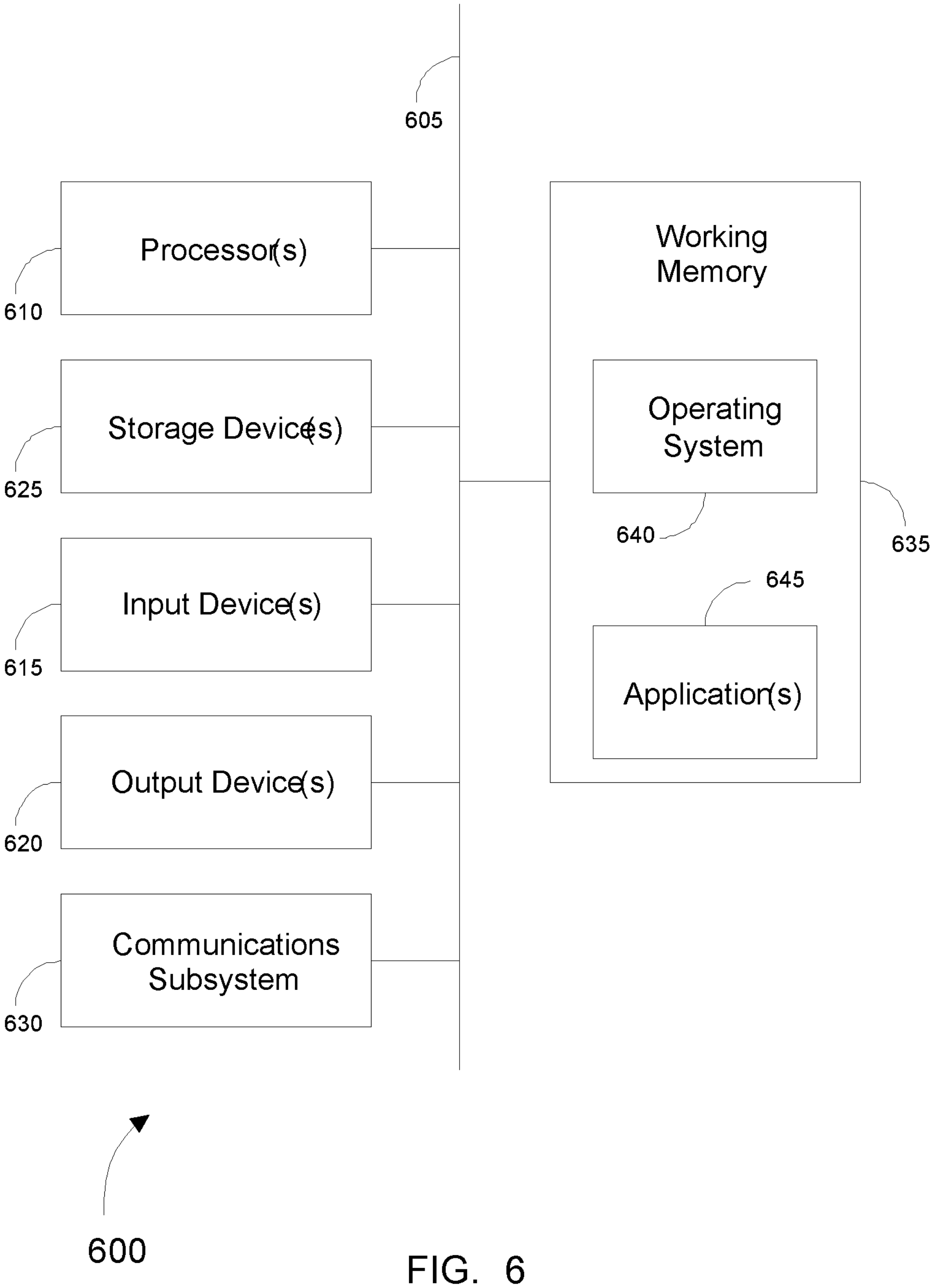
FIG. 6 shows one potential implementation of a computing device that may be used in accordance with various embodiments.

FIG. 6 provides a schematic illustration of one embodiment of a computer system 600 that can perform the methods of the invention, as described herein, and/or can function, for example, as any part of a control module, communication module, or satellite module as described herein. It should be noted that FIG. 6 is meant only to provide a generalized illustration of various components, any or all of which may be utilized, as appropriate. FIG. 6, therefore, broadly illustrates how individual system elements may be implemented in a relatively separated or relatively more integrated manner.

The computer system 600 is shown comprising hardware elements that can be electrically coupled via a bus 605 (or may otherwise be in communication, as appropriate). The hardware elements can include one or more processors 610, including, without limitation, one or more general-purpose processors and/or one or more special-purpose processors (such as digital signal processing chips, graphics acceleration chips, and/or the like); one or more input devices 615, which can include, without limitation, a mouse, a keyboard, and/or the like; and one or more output devices 620, which can include, without limitation, a display device, a printer, and/or the like.

The computer system 600 may further include (and/or be in communication with) one or more storage devices 625, which can comprise, without limitation, local and/or network accessible storage and/or can include, without limitation, a disk drive, a drive array, an optical storage device, a solid-state storage device such as a random access memory ("RAM"), and/or a read-only memory ("ROM"), which can be programmable, flash-updateable, and/or the like. The computer system 600 might also include a communications subsystem 630, which can include, without limitation, a modem, a network card (wireless or wired), an infrared communication device, a wireless communication device and/or chipset (such as a Bluetooth™ device, an 802.11 device, a Wi-Fi device, a WiMax device, cellular communication facilities, etc.), and/or the like. The communications subsystem 630 may permit data to be exchanged with a network (such as the network described below, to name one example), and/or any other devices described herein. In many embodiments, the computer system 600 will further comprise a working memory 635, which can include a RAM or ROM device, as described above.

In certain embodiments, communications subsystem 630 may include a modem that may receive information for transmission via a satellite communications system. Such a modem system as part of communications subsystem 630 may include a modulator/demodulator—provides a modulated signal to an antenna and demodulates signals received at an antenna from a satellite communications system.

The computer system 600 also can comprise software elements, shown as being currently located within the working memory 635, including an operating system 640 and/or other code, such as one or more application programs 645, which may comprise computer programs of the invention and/or may be designed to implement methods of the invention and/or configure systems of the invention, as described herein. Merely by way of example, one or more procedures described with respect to the method(s) discussed above might be implemented as code and/or instructions executable by a computer (and/or a processor within a computer). A set of these instructions and/or code might be stored on a computer readable storage medium, such as the storage device(s) 625 described above. In some cases, the storage medium might be incorporated within a computer system, such as the system 600. In other embodiments, the storage medium might be separate from a computer system (i.e., a removable medium, such as a compact disc, etc.), and/or provided in an installation package, such that the storage medium can be used to program a general purpose computer with the instructions/code stored thereon. These instructions might take the form of executable code, which is executable by the computer system 600, and/or might take the form of source and/or installable code which, upon compilation and/or installation on the computer system 600 (e.g., using any of a variety of generally available compilers, installation programs, compression/decompression utilities, etc.), then takes the form of executable code.

It will be apparent to those skilled in the art that substantial variations may be made in accordance with specific requirements. For example, customized hardware might also be used, and/or particular elements might be implemented in hardware, software (including portable software, such as applets, etc.), or both. Further, connection to other computing devices such as network input/output devices may be employed.

In one aspect, the invention employs a computer system (such as the computer system 600) to perform methods of the invention. According to a set of embodiments, some or all of the procedures of such methods are performed by the computer system 600 in response to processor 610 executing one or more sequences of one or more instructions (which might be incorporated into the operating system 640 and/or other code, such as an application program 645) contained in the working memory 635. Such instructions may be read into the working memory 635 from another machine-readable medium, such as one or more of the storage device(s) 625. Merely by way of example, execution of the sequences of instructions contained in the working memory 635 might cause the processor(s) 610 to perform one or more procedures of the methods described herein.

The terms "machine-readable medium" and "computer readable medium", as used herein, refer to any medium that participates in providing data that causes a machine to operate in a specific fashion. In an embodiment implemented using the computer system 600, various machine-readable media might be involved in providing instructions/code to processor(s) 610 for execution and/or might be used to store and/or carry such instructions/code (e.g., as signals). In many implementations, a computer readable medium is a physical and/or tangible storage medium. Such a medium may take many forms, including, but not limited to, non-volatile media, volatile media, and transmission media. Non-volatile and non-transitory media includes, for example, optical or magnetic disks, such as the storage device(s) 625. Volatile media includes, without limitation, dynamic memory, such as the working memory 635. Transmission media includes coaxial cables, copper wire, and fiber optics, including the wires that comprise the bus 605, as well as the various components of the communications subsystem 630 (and/or the media by which the communications subsystem 630 provides communication with other devices). Hence, transmission media can also take the form of waves (including, without limitation, radio, acoustic, and/or light waves, such as those generated during radio-wave and infrared data communications).

Common forms of physical and/or tangible computer readable media include, for example, a floppy disk, a flexible disk, hard disk, magnetic tape, or any other magnetic medium, a CD-ROM, any other optical medium, punch-cards, papertape, any other physical medium with patterns of holes, a RAM, a PROM, an EPROM, a FLASH-EPROM, any other memory chip or cartridge, a carrier wave as described hereinafter, or any other medium from which a computer can read instructions and/or code.

Various forms of machine-readable media may be involved in carrying one or more sequences of one or more instructions to the processor(s) 610 for execution. Merely by way of example, the instructions may initially be carried on a magnetic disk and/or optical disc of a remote computer. A remote computer might load the instructions into its dynamic memory and send the instructions as signals over a transmission medium to be received and/or executed by the computer system 600. These signals, which might be in the form of electromagnetic signals, acoustic signals, optical signals, and/or the like, are all examples of carrier waves on which instructions can be encoded, in accordance with various embodiments of the invention.

The communications subsystem 630 (and/or components thereof) generally will receive the signals, and the bus 605 then might carry the signals (and/or the data, instructions, etc., carried by the signals) to the working memory 635, from which the processor(s) 605 retrieves and executes the instructions. The instructions received by the working memory 635 may optionally be stored on a storage device 625 either before or after execution by the processor(s) 610.

Also, it is noted that the embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in the figure. A process may correspond to a method, a function, a procedure, a subroutine, a subprogram, etc. When a process corresponds to a function, its termination corresponds to a return of the function to the calling function or the main function.

Furthermore, embodiments may be implemented by hardware, software, scripting languages, firmware, middleware, microcode, hardware description languages, and/or any combination thereof. When implemented in software, firmware, middleware, scripting language, and/or microcode, the program code or code segments to perform the necessary tasks may be stored in a machine readable medium such as a storage medium. A code segment or machine-executable instruction may represent a procedure, a function, a subprogram, a program, a routine, a subroutine, a module, a software package, a script, a class, or any combination of instructions, data structures, and/or program statements. A code segment may be coupled to another code segment or a hardware circuit by passing and/or receiving information, data, arguments, parameters, and/or memory contents. Information, arguments, parameters, data, etc. may be passed, forwarded, or transmitted via any suitable means including memory sharing, message passing, token passing, network transmission, etc.

In various embodiments, control and computer devices described in FIG. 6 above may be networked together to implement various aspects of the embodiments. In one embodiment, a proxy server and/or client may be implemented in conjunction with the satellite communication system and offset controls as computer system 600 in FIG. 6 as part of a communication including a satellite such as satellite 110 of FIG. 1. Such a communication system can include one or more system computers in networked communications. The computers can be general purpose personal computers (including, merely by way of example, personal computers and/or laptop computers running any appropriate flavor of Windows ° operating systems and/or Mac OS ° operating system software) and/or workstation computers running any of a variety of commercially-available UNIX® or UNIX-like operating systems. These user computers may also have any of a variety of applications, including one or more applications configured to perform methods of the embodiments, as well as one or more control, reporting measuring, or power management, or other computing applications. Any number of computers can be supported by such a system.

Certain embodiments operate in a networked environment. The network can be any type of network familiar to those skilled in the art that can support data communications using any of a variety of commercially-available protocols, including, without limitation, TCP/IP, SNA, IPX, AppleTalk®, and the like. Merely by way of example, the network can be a local area network (LAN), including, without limitation, an Ethernet network; a Token-Ring network and/or the like; a wide-area network (WAN); a virtual network, including, without limitation, a virtual private network (VPN); the Internet; an intranet; an extranet; a public switched telephone network (PSTN); an infrared network; a wireless network, including, without limitation, a network operating under any of the IEEE 802.11 suite of protocols, the Bluetooth™ protocol known in the art, and/or any other wireless protocol; and/or any combination of these and/or other networks.

Embodiments of the invention can include one or more server computers. Each of the server computers may be configured with an operating system, including, without limitation, any of those discussed above, as well as any commercially (or freely) available server operating systems. Each of the servers may also be running one or more applications, which can be configured to provide services or communication information to a device, control module, or antenna operating according to various embodiments described herein.

The server computers, in some embodiments, might include one or more application servers, which can include one or more applications accessible by a client running on one or more of the client computers and/or other servers. Merely by way of example, the server(s) can be one or more general purpose computers capable of executing programs or scripts in response to the user computers 1505 and/or other servers 1515, including, without limitation, web applications (which might, in some cases, be configured to perform methods of the invention). Merely by way of example, a web application can be implemented as one or more scripts or programs written in any suitable programming language, such as Java, C, C# or C++, and/or any scripting language, such as Perl, Python, or TCL, as well as combinations of any programming/scripting languages. The application server(s) can also include database servers, including without limitation those commercially available from Oracle®, Microsoft®, Sybase °, IBM °, and the like, which can process requests from clients (including, depending on the configurator, database clients, API clients, web browsers, etc.) running on a first computer and/or another server. Data provided by an application server may be formatted as web pages (comprising HTML, JavaScript, etc., for example) and/or may be forwarded to a computer via a web server (as described above, for example). In some cases a web server may be integrated with an application server.

In accordance with further embodiments, one or more servers can function as a file server and/or can include one or more of the files (e.g., application code, data files, etc.) necessary to implement methods of an embodiment incorporated by an application running on a computer and/or another server. Alternatively, as those skilled in the art will appreciate, a file server can include all necessary files, allowing such an application to be invoked remotely by a computer, antenna control module, and/or server. It should be noted that the functions described with respect to various servers herein (e.g., application server, database server, file server, etc.) can be performed by a single server and/or a plurality of specialized servers, depending on implementation-specific needs and parameters.

In certain embodiments, the system can include one or more databases. The location of the database(s) is discretionary: merely by way of example, a database might reside on a storage medium local to (and/or resident in) a server in a fixed location and communicate to mobile antennas via a satellite such as satellite 110 of FIG. 1. Alternatively, a database can be remote and/or mobile in relation to any of the computers or servers, so long as the database can be in communication with one or more of these. For example, the database may reside on a mobile server farm located on an ocean going ship. In a particular set of embodiments, a database can reside in a storage-area network (SAN) familiar to those skilled in the art. Likewise, any necessary files for performing the functions attributed to the computers or servers can be stored locally on the respective computer and/or remotely, as appropriate. In one set of embodiments, the database can be a relational database, such as an Oracle database, that is adapted to store, update, and retrieve data in response to SQL-formatted commands. The database might be controlled and/or maintained by a database server, as described above, for example.

Further, certain portions of embodiments (e.g., method steps) may be described as being implemented "as a function of" other portions of embodiments. This and similar phraseologies, as used herein, intend broadly to include any technique for determining one element partially or completely according to another element. For example, a method may include setting an antenna beam offset position "as a function of" an adjacent satellite location and/or movement of the antenna. In various embodiments, the determination may be made in any way, so long as the outcome of the determination generation step is at least partially dependent on the outcome of the fingerprint generation step.

While the invention has been described with respect to exemplary embodiments, one skilled in the art will recognize that numerous modifications are possible. For example, the methods and processes described herein may be implemented using hardware components, software components, and/or any combination thereof. Further, while various methods and processes described herein may be described with respect to particular structural and/or functional components for ease of description, methods of the invention are not limited to any particular structural and/or functional architecture but instead can be implemented on any suitable hardware, firmware, and/or software configurator. Similarly, while various functionalities are ascribed to certain system components, unless the context dictates otherwise, this functionality can be distributed among various other system components in accordance with different embodiments of the invention.

Moreover, while the procedures comprised in the methods and processes described herein are described in a particular order for ease of description, unless the context dictates otherwise, various procedures may be reordered, added, and/or omitted in accordance with various embodiments of the invention. Moreover, the procedures described with respect to one method or process may be incorporated within other described methods or processes; likewise, system components described according to a particular structural architecture and/or with respect to one system may be organized in alternative structural architectures and/or incorporated within other described systems. Hence, while various embodiments are described with—or without—certain features for ease of description and to illustrate exemplary features, the various components and/or features described herein with respect to a particular embodiment can be substituted, added, and/or subtracted from among other described embodiments, unless the context dictates otherwise. Consequently, although the invention has been described with respect to exemplary embodiments, it will be appreciated that the invention is intended to cover all modifications and equivalents within the scope of the following claims.

What is claimed is:

1. An antenna for communicating with a target satellite comprising:

a radiating surface comprising a planar array of radiating elements configured to produce a beam having an asymmetric antenna pattern, wherein the asymmetric antenna pattern has a narrow-beamwidth axis and a wide-beamwidth axis;

beam offset circuitry configured to offset the produced beam to an offset angle along the narrow-beamwidth axis;

an adjustment mechanism coupled to the radiating surface and configured to adjust a position of the radiating surface; and control circuitry configured to provide commands to the adjustment mechanism to adjust the position of the radiating surface to direct the produced beam at the target satellite based at least in part on the offset angle and a location of the antenna, wherein, for the antenna at a particular location, the offset angle is such that an angle of the wide-beamwidth axis relative to an arc associated with the target satellite and one or more other satellites is increased relative to a non-offset beam of the radiating surface toward the target satellite.

2. The antenna of claim 1, wherein the offset angle of the produced beam is fixed relative to the radiating surface.

3. The antenna of claim 1, wherein the offset angle of the produced beam is steerable relative to the radiating surface.

4. The antenna of claim 3, wherein the beam offset circuitry is configured to select the offset angle based at least on the location of the antenna.

5. The antenna of claim 3, wherein the beam offset circuitry is configured to select the offset angle based at least on an amount of interference with the one or more other satellites.

6. The antenna of claim 1, wherein the offset angle is such that it alters the angle of the wide-beamwidth axis relative to the arc to a larger angle to reduce interference with one or more other satellites adjacent to the target satellite along the arc relative to the non-offset beam.

7. The antenna of claim 1, wherein the offset angle alters a service area of the antenna to communicate with the target satellite.

8. The antenna of claim 1, wherein the offset angle configured by the beam offset circuitry is based on relative phase shifts between a plurality of signals communicated with a plurality of radiating elements.

9. The antenna of claim 8, wherein the relative phase shifts are fixed.

10. The antenna of claim 8, wherein the beam offset circuitry adjusts the relative phase shifts.

11. The antenna of claim 1, wherein the adjustment mechanism comprises a mechanical azimuth adjustment and a mechanical elevation adjustment.

12. The antenna of claim 1, wherein the planar array comprises an electronically steerable phased array, and wherein the offset angle of the produced beam is offset in a narrow beamwidth direction by the electronically steerable phased array.

13. The antenna of claim 1, wherein the offset angle is only along the narrow-beamwidth axis.

* * * * *